United States Patent
Kumar

(10) Patent No.: US 9,640,866 B2
(45) Date of Patent: May 2, 2017

(54) SYSTEMS AND METHODS FOR MULTI-BEAM ANTENNA ARCHITECTURES FOR ADAPTIVE NULLING OF INTERFERENCE SIGNALS

(71) Applicant: Rajendra Kumar, Cerritos, CA (US)

(72) Inventor: Rajendra Kumar, Cerritos, CA (US)

(*) Notice: Subject to any disclaimer, the term of this patent is extended or adjusted under 35 U.S.C. 154(b) by 1122 days.

(21) Appl. No.: 13/761,455

(22) Filed: Feb. 7, 2013

(65) Prior Publication Data

US 2014/0327576 A1 Nov. 6, 2014

(51) Int. Cl.
*H01Q 3/26* (2006.01)
*H04B 7/08* (2006.01)

(52) U.S. Cl.
CPC .......... *H01Q 3/2617* (2013.01); *H04B 7/086* (2013.01); *H04B 7/088* (2013.01); *H04B 7/0842* (2013.01)

(58) Field of Classification Search
CPC .. H01Q 3/2611; H01Q 3/2617; H04B 7/0842; H04B 7/086; H04B 7/088; H04B 7/08855; H04B 7/0888
See application file for complete search history.

(56) References Cited

U.S. PATENT DOCUMENTS

| | | | | |
|---|---|---|---|---|
| 6,034,634 A | * | 3/2000 | Karlsson | H01Q 3/08 342/354 |
| 6,084,540 A | * | 7/2000 | Yu | G01S 3/28 342/13 |
| 7,145,972 B2 | * | 12/2006 | Kumar | H04L 5/06 375/349 |
| 7,403,577 B2 | | 7/2008 | Kumar | |
| 7,450,924 B1 | | 11/2008 | Mostafa et al. | |
| 2001/0020918 A1 | * | 9/2001 | Takai | H01Q 1/246 343/729 |
| 2001/0048389 A1 | * | 12/2001 | Nakagawa | H04B 1/709 342/378 |

(Continued)

OTHER PUBLICATIONS

Multiplicity. (1992). Academic Press Dictionary of Science and Technology. Oxford, United Kingdom: Elsevier Science & Technology. Retrieved from http://search.credoreference.com/content/entry/apdst/multiplicity/0.*

(Continued)

*Primary Examiner* — Bernarr Gregory
*Assistant Examiner* — Fred H Mull
(74) *Attorney, Agent, or Firm* — Fulwider Patton LLP

(57) ABSTRACT

Various embodiments described herein are directed to methods and systems for multibeam adaptive antenna architectures for recovering user signals in the coverage area of the antenna in the presence of interference sources. For example, various embodiments may utilize an architecture comprised of an array of antenna feeds, an RF to baseband conversion subsystem, a bank of digital beamformers, a channelization subsystem, a bank of weighted combiners, and a bank of demodulators for the demodulation and detection of user signals. The multiple beamformers introduce nulls in the direction of interference sources based on distinct adaptive algorithms for providing different antenna beam patterns after adaptation. Various other embodiments may utilize architecture for providing the directions of the interference sources or intentional jammers.

22 Claims, 17 Drawing Sheets

(56) References Cited

U.S. PATENT DOCUMENTS

2008/0260017 A1* 10/2008 Tsuie ............... H04L 25/03057
375/233
2010/0117893 A1* 5/2010 Dreher ................. B64G 1/66
342/352

OTHER PUBLICATIONS

R. Kumar, Adaptive Decision-Directed Quantized-State Algorithms for Multi-user Detection of CDMA Signals, 2007 IEEE Aerospace Conference, p. 1-12, Mar. 2007.*

R.L. Haupt, Calibration of Cylindrical Reflector Antennas With Linear Phased Array Feeds, IEEE Transactions on Antennas and Propagation, vol. 56(2), Feb. 2008.*

Multiplicity. (2011). The American Heritage Dictionary of the English Language. Boston, MA: Houghton Mifflin. Retrieved from http://search.credoreference.com/content/entry/hmdictenglang/multiplicity/0.*

Rajendra Kumar et al., Adaptive Equalization via Fast Quantized-State Methods, IEEE Transactions on Communications, Oct. 1981, pp. 1492-1501, vol. COM-29, No. 10.

Rajendra Kumar et al., Signal Processing Techniques for Wideband Communications Systems, IEEE, 1999, pp. 452-457, El Segundo, CA.

Rajendra Kumar, Adaptive Algorithms for Antenna Array Signal Processing, 1995, 8 pages, California State University, Long Beach, CA.

R. Kumar, Multi-Element Array Signal Reconstruction With Adaptive Least-Squares Algorithms, International Journal of Adaptive Control and Signal Processing, Jul. 1992, pp. 561-588, vol. 6, John Wiley & Sons, Ltd., Long Beach, CA.

Rajkumar A. Joshi, Adaptive Nulling in Multiple Beam Antennas Using Quantized State Adaptive Algorithms, May 2010, pp. 1-125, Long Beach, CA.

Jason Duggan et al., Adaptive Beamforming With a Multiple Beam Antenna, IEEE, 1998, pp. 395-401, Queen's University.

M. H. Er et al., A New Approach to Robust Beamforming in the Presence of Steering Vector Errors, IEEE Transactions on Signal Processing, Jul. 1994, pp. 1826-1829, vol. 42, No. 7.

The Constant Modulus Algorithm, TU Delft Univ., 12 pages.

Sammuel Jalali, Wireless Channel Equalization in Digital Communication Systems, 2012, 166 pages, Claremont, CA and Long Beach, CA.

Sudhakar K. Rao, Design and Analysis of Multiple-Beam Reflector Antennas, IEEE Antennas and Propagation Magazine, Aug. 1999, pp. 53-59, vol. 41, No. 4, Los Angeles, CA.

Sudhakar K. Rao, Parametric Design and Analysis of Multiple-Beam Reflector Antennas for Satellite Communications, IEEE Antennas and Propagation Magazine, Aug. 2003, pp. 26-34, vol. 45, No. 4, Los Angeles, CA.

Shung-Wu Lee et al., Simple Formulas for Designing an Offset Multibeam Parabolic Reflector, IEEE Transactions on Antennas and Propagation, May 1981, pp. 472-478, vol. AP-29, No. 3.

Yoichi Sato, A Method of Self-Recovering Equalization for Multilevel Amplitude-Modulation Systems, IEE Transactions on Communications, Jun. 1975, pp. 679-682, Kawasaki, Japan.

John Ruze, Lateral-Feed Displacement in a Paraboloid, IEEE Transactions on Antennas and Propagation, Mar. 11, 1965, pp. 660-665 Lexington, MA.

Y. T. Lo, On the Beam Deviation Factor of a Parabolic Reflector, IRE Transactions on Antennas and Propagations, Feb. 8, 1960, pp. 347-349.

Joseph T. Mayhan, Nulling Limitations for a Multiple-Beam Antenna, IEEE Transactions on Antennas and Propagation, Nov. 1976, pp. 769-779, vol. AP-24, No. 6, Lexington, MA.

Joseph T. Mayhan, Area Coverage Adaptive Nulling From Geosynchronous Satellites: Phased Arrays Versus Multiple-Beam Anennas, IEEE Transactions on Antennas and Propagation, Mar. 1986, pp. 410-419, vol. AP-34, No. 3, Lexington, MA.

* cited by examiner

SYSTEMS AND METHODS FOR MULTI-BEAM ANTENNA ARCHITECTURES FOR ADAPTIVE NULLING OF INTERFERENCE SIGNALS

BACKGROUND

A multiple Beam Antenna (MBA) is a type of antenna system employed in the satellite applications and under normal operating mode has a field of view (FOV) that covers a section of the Earth's surface termed the coverage area. The MBA contains several feeds that illuminate a lens or a reflector system to produce multiple beams. The adaptive MBA is designed to combat interference sources including intentional jammers located anywhere within the desired area covered by the quiescent pattern of the antenna. This is accomplished by relatively high resolution afforded by a multibeam antenna with a relatively large aperture size and a significant number of beams providing the desired degrees of freedom in the adaptive nulling process. The outputs of the multiple beams are linearly combined in the MBA beamformer in an adaptive manner so as to introduce nulls in the direction of interference sources while minimizing the inevitable antenna gain reduction in any other direction within the quiescent beam width. To achieve the desired objectives effectively, the adaptive algorithm must have sufficiently rapid convergence rate to adapt in a dynamic scenario, such as the presence of blinking jammers, and have reasonable computational requirements in terms of the actual number of arithmetic operations per update of the algorithm.

The adaptive algorithms of the prior art are based on the constrained optimization of the array gain related to the signal to noise power ratio for a signal source in the direction of the peak of the antenna gain as specified by the steering vector. The steering vector or the quiescent weight vector actually produces reasonable directive gain to users in the specified coverage area in the absence of jammers—essentially a property of the MBA antenna.

However, this is not the case with the adapted pattern obtained with the adaptive algorithm in the presence of jammers wherein there is considerable reduction in the antenna gain in the coverage area with the reduction being highly non uniform over the area of coverage. One of the adaptive algorithms termed SMI (Sample Matrix Inversion) minimizes the residual interference power at the MBA beamformer output. However, the SMI algorithm does not optimize the area covered by the adapted beam. In terms of implementation, the SMI algorithm requires $N^2$ complex multiplications and additions and an N×N matrix inversion for each algorithm update wherein N is the number of beams in the MBA. Furthermore, in situations involving multiple jammers of varying power levels, the estimated correlation matrix may become ill conditioned and high precision arithmetic may be required to avoid numerical instability. A computationally simpler algorithm termed correlation feedback (CF) requires only order N computations. However, for the case of high condition number of the relevant correlation matrix involved, the convergence may be very slow and may not be acceptable in some dynamic scenario.

Quantized state (QS) algorithms taught by Kumar have convergence rates similar to that of SMI algorithm and possibly orders of magnitude faster than the CF algorithm. The QS algorithm require much smaller computational requirements compared to the SMI algorithm and are also numerically robust with matrix condition number that is order of the square root of the condition number of the correlation matrix involved in the SMI algorithm. The quantizes state algorithms are also capable of providing better gain distribution in the coverage area than the SMI algorithm especially in areas in the vicinity of the interference sources.

The adaptive algorithms of the previous literature exhibit spurious nulls in the adapted MBA beam pattern, in that the antenna gain pattern has nulls in the directions other than the direction of the interfering sources. The number of the spurious nulls, their locations and depth is highly variable and depends upon the algorithm used, the number of interfering sources, their directions and power levels, etc., and is otherwise unpredictable. Due to these spurious nulls, the coverage area of the MBA antenna has undesirable holes around these nulls in addition to those around the interfering sources.

Thus it is desirable to have architectures that eliminate the presence of spurious nulls in the area of coverage, provide superior antenna gain distribution in the coverage area compared to the architectures of the prior art, and result in a higher signal to interference plus noise ratio for the users located in the coverage area. It may be also desirable to be able to have architectures for finding the directions of the interference sources including intentional jammers for RF surveillance purposes. The adaptive multibeam architectures of this invention possess these and various other benefits.

SUMMARY OF THE INVENTION

Various embodiments described herein are directed to methods and systems for adaptive multibeam antenna architectures for recovering users' signals transmitted from sources in the coverage area of the antenna in the presence of interference sources. The invention presents architectures that mitigate the presence of spurious nulls in the area of coverage, provide superior antenna gain distribution in the coverage area compared to the architectures of the prior art, and result in a higher signal to interference plus noise ratio for the users located in the coverage area. For example, various embodiments may utilize an architecture comprised of an array of antenna feeds, an RF to baseband conversion subsystem, a bank of digital beamformers, a channelization subsystem, a bank of weighted combiners, and a bank of demodulators for the demodulation and detection of user signals.

In one of the invented architectures, the bank of digital beamformers is comprised of a multiplicity M of MBA beamformers that have a common RF front end and employ different algorithms, for example, one of the MBAs may employ one of the QS algorithms with the other employing SMI algorithm in the case of two beamformers and combining the outputs of the multiplicity of the beamformers to produce the resultant MBA pattern. As another example, two different QS algorithms may be employed in the two of the beamformers thus maintaining the computational advantages of the QS algorithm.

The invented architecture inherits many advantages of the various algorithms in the component beamformers resulting in an overall superior antenna gain distribution in the coverage area after the adaptation. Due to different weight vector arrived at by the different adaptive algorithms in the multiplicity of the beamformers resulting from a relatively large degree of freedom due to the number of beams N being much higher than the number of interference sources, the residual interference from M different beamformers may have significant decorrelation among them. Thus a diversity gain can be realized by combining the outputs of the M beamformers using, for example, maximal ratio combining, in addition to the gain that will be realized by the selecting the beamformer with the highest antenna gain.

As the antenna gain of any of the M beamformers is highly non uniform over the coverage area, such a selection or maximal ratio combining performed over the total outputs of the multiplicity M beamformers may not provide the complete benefit of the diversity combining. However, the realization that different users in the coverage area transmit their signals in a multiple access mode such as the frequency division multiple accessing (FDMA) mode, users at different locations in the coverage area can be differentiated on the basis of the frequency bands allocated to them for transmission. Therefore, the invention presents architectures that first channelize different user signals based on their allocated bandwidth in FDMA system or assigned code in the CDMA (Code Division Multiple Accessing) System for each of the M beamformers and then using diversity combining or selection techniques for different users realize a full benefit of the multiple beamformer architecture with diversity combining. Various other embodiments of the architecture of the invention may use various other multiple accessing modes including time division multiple accessing (TDMA) mode and various hybrid modes.

The invention presents algorithms such as the quantized state algorithms with multiple thresholds termed generalized quantized state (GQS) algorithms and transformed state quantized state (TQS) algorithms that may be employed in various embodiments of the invented multibeam antenna architectures. The method for obtaining the input threshold levels and the corresponding quantized state levels in terms of the power levels of the multiplicity N feeds' outputs is presented for increased antenna gain in the close vicinity of the interference sources.

Various embodiment of one of the architectures may comprise of phased array antenna with multiple digital beamformers wherein a single digital beamformers may receive signals from multiple signal sources, transmitting in different frequency bands in a the FDMA mode or using different codes in the CDMA mode, while introducing nulls in the direction of interference sources. In various embodiments of the invention, more than one digital beamformer may receive signal from a common source and a diversity gain may be achieved by combining the signals from multiple digital beamformers. As an example of M equal to 4 digital beamformers with K equal to 4 different desired signal sources transmitting in different bandwidth slots, wherein one of the four digital beamformers may receive signals from κ=3 signal sources with indices (1, 2, 3) with the other three digital beamformers receiving signals from the sources given with indices (1, 3, 4), (2, 3, 4) and (1, 2, 4) respectively and appropriately combining these signals in the signal combiners may result in achieving triple diversity gain.

An important characteristic of the invented architecture is that the resultant composite MBA beam pattern does not exhibit any spurious nulls in the coverage area when the multiplicity of the beamformers M is sufficient. This is due to the fact that different beamformers employ different adaptive algorithms and thus their spurious nulls may not coincide with the result that any of the users that are not in the immediate vicinity of the interfering sources do not experience antenna gain null and the resulting loss in the availability of the communication link. Furthermore the gain pattern obtained by selecting the maximum of the gain of the M beamformers at each location of the coverage area also may not exhibit any spurious nulls. The absence of spurious nulls makes it possible to precisely locate the sources of interference with the MBA architecture of the invention useful for possible counter measures.

These and other advantages of the invention will be apparent form the detailed description of the invention.

BRIEF DESCRIPTION OF THE DRAWINGS

Various embodiments of the present invention are described here by way of example in conjunction with the following figures, wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide systems and methods for adaptive multibeam antenna architectures.

Figure 1:
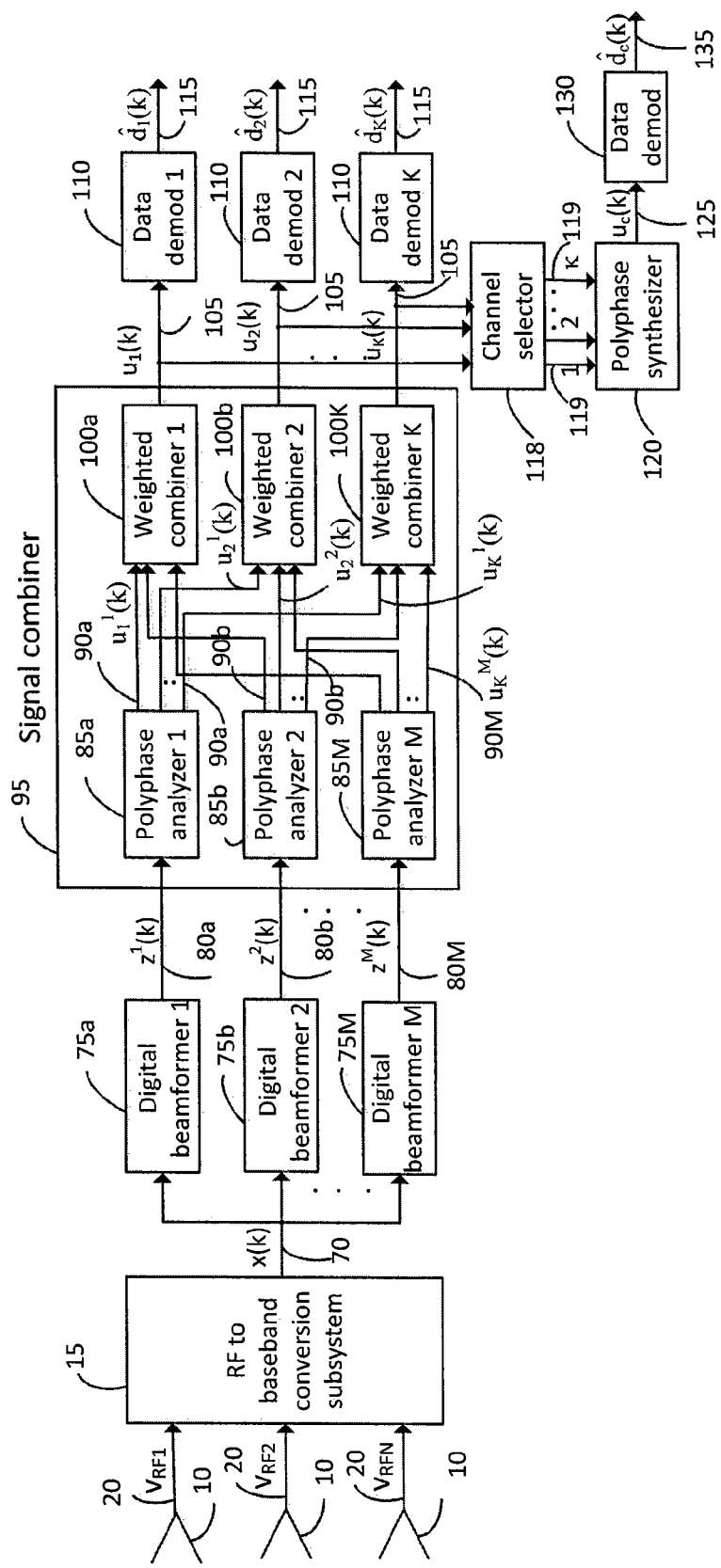
FIG. 1 shows a block diagram of one embodiment of multi-beam antenna system for the case of frequency division multiple accessing (FDMA) mode.

FIG. 1 shows one of the preferred embodiments of the invention for the MBA system 1 for the case of the Frequency Division Multiple Accessing (FDMA) communication system wherein the various users in the coverage area of the MBA are allocated different segments of the MBA system bandwidth. In the FDMA system the users in different geographical locations have different segments of the spectrum allocated to them and may experience different MBA antenna gain due to the introduction of the nulls in the direction of the interference sources.

Referring to FIG. 1, the RF signals 20 $v_{RF1}, \ldots, v_{RFN}$ at the output of the N RF feeds 10 in the focal plane of the MBA reflector, not shown, are inputted to the RF to baseband conversion subsystem 15 for providing the state vector 70 $x(k)$ comprised of the digital complex baseband signals to the digital beamformers 75a through M. Throughout the description of the invention, the notations a, b, . . . , M and 1, 2, . . . , M for any integer ** are equivalent and both refer to the enumeration between 1 and M. In various other embodiments of the invention, the reflector may be replaced by a lens.

Figure 2:
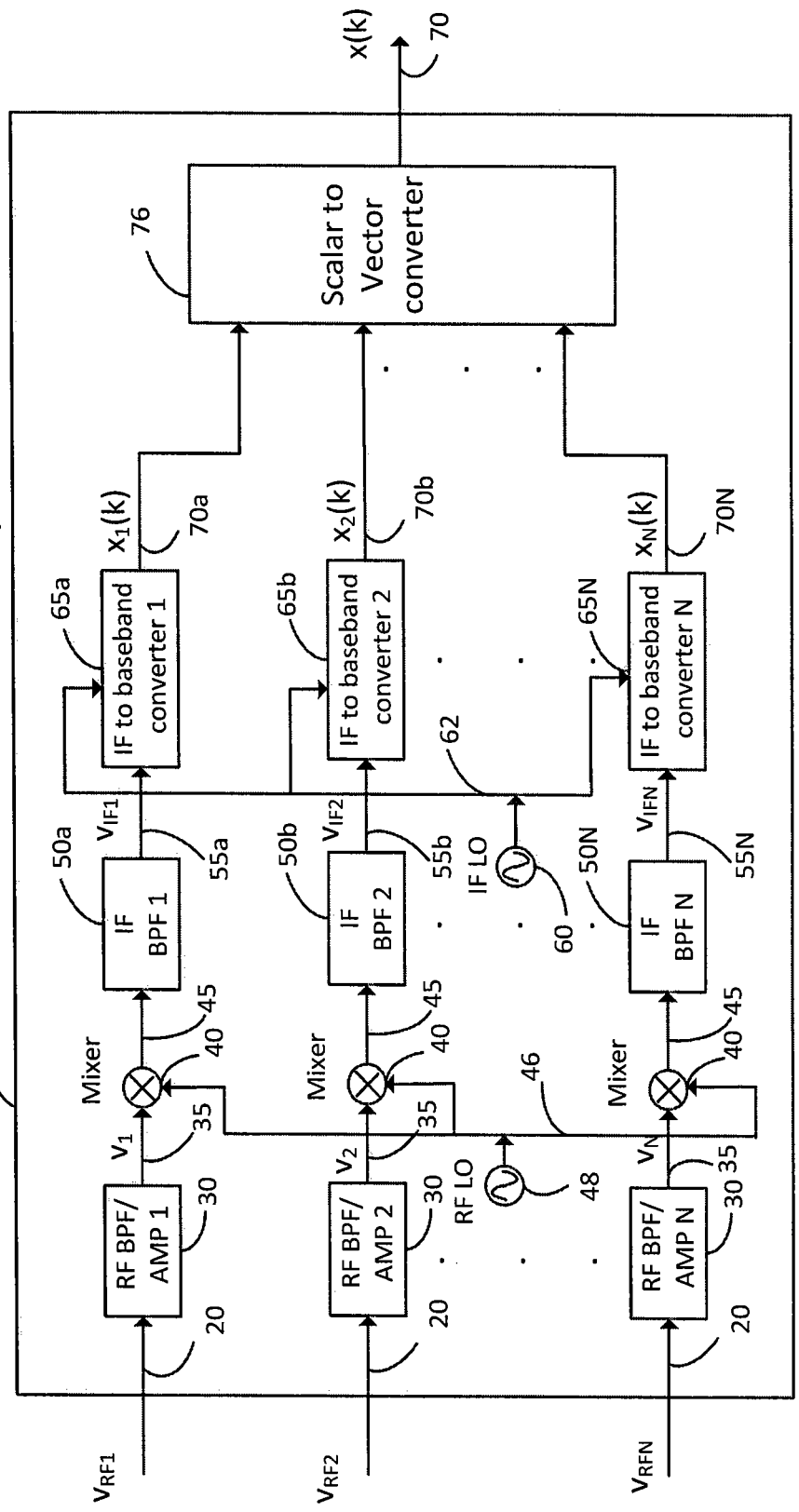
FIG. 2 shows a block diagram of one embodiment of RF to baseband conversion subsystem.

FIG. 2 shows the block diagram of the RF to baseband conversion subsystem 15. Referring to FIG. 2, RF signals 20 $v_{RF1}, \ldots, v_{RFN}$ at the output of the N RF feeds 10 are inputted to the RF bandpass filters/amplifier 30 blocks 1, 2, . . . , N. The RF amplifier/bandpass filters 30 reject any out of band interference and noise and amplify the RF signals at the outputs of the RF feeds 10. Referring to FIG. 2 the filtered and amplified RF signals 35 $v_1, \ldots, v_N$ at the output of the RF BPF/AMP 30 blocks are inputted to the mixers 40 for down converting the center frequency of the RF signals 35 to an intermediate frequency $f_{IF}$. The second input of the mixers 40 are connected to the output 46 of the RF local oscillator 48. The mixer output signals 45 are inputted to the IF bandpass filter blocks 50 that may also provide further amplification of the input signal 45. The IF signals 55 a, b, . . . , N $v_{IF1}, \ldots, v_{IFN}$ at the output of IF BPF filter blocks 50 are inputted to the respective N IF to baseband converters 65 providing the digital complex baseband signals 70 a, b, . . . , N $x_1(k), \ldots, x_N(k)$ to the scalar to vector converter 76 that provides the state vector $x(k)$ comprised of the digital complex baseband signals $x_1(k), \ldots, x_N(k)$ as its elements at the output 70. The second inputs of the IF to digital baseband converters 65 blocks are connected to the output 62 of the IF local oscillator 60.

Figure 2A:
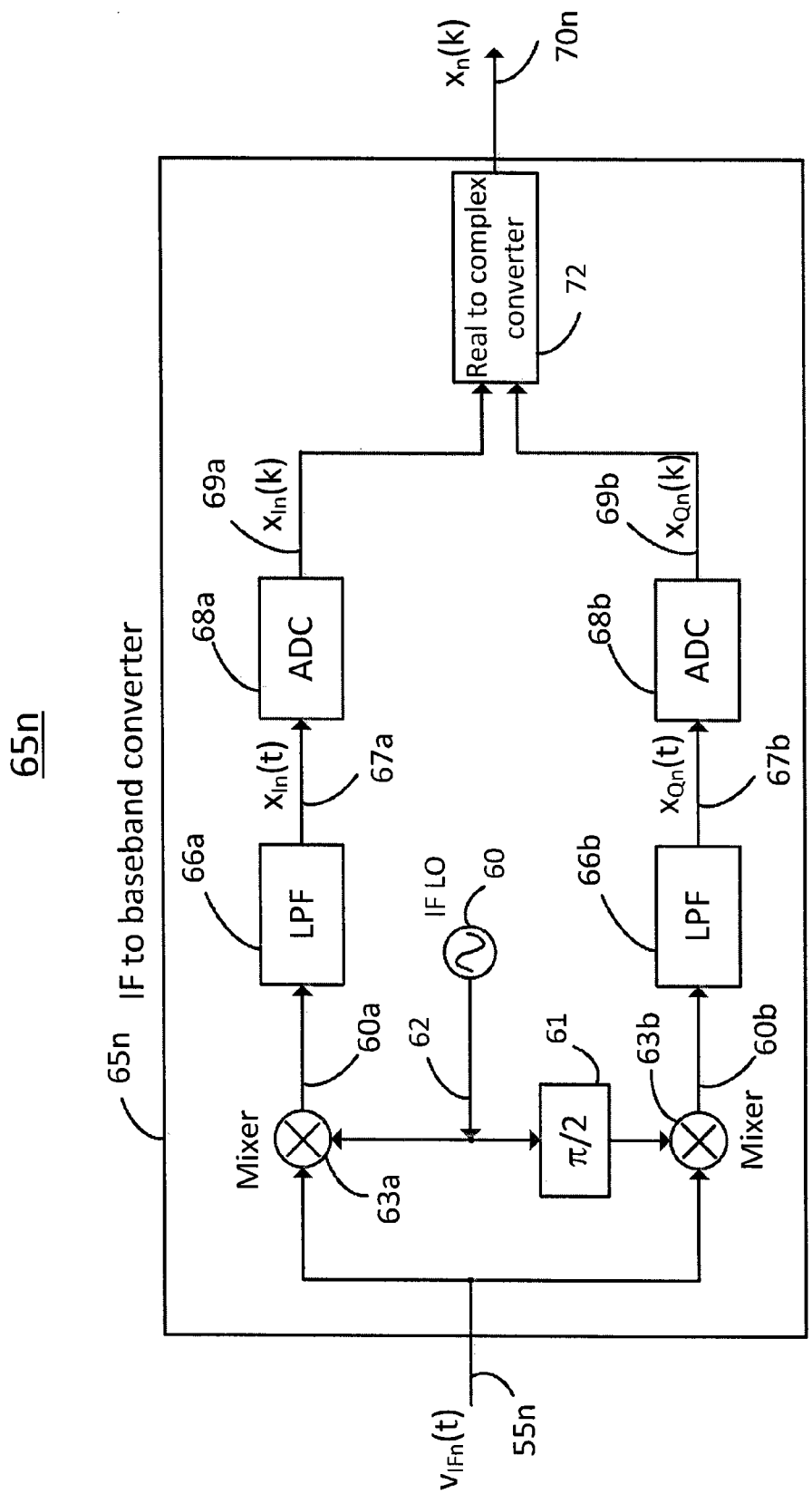
FIG. 2A shows a block diagram of one embodiment of IF to baseband converter.

FIG. 2A shows the block diagram of the IF to baseband converter 65n for n=1, 2, . . . , N. Referring to FIG. 2A, the IF signal 55n $v_{IFn}$ is inputted to the inphase mixer 63a and the quadrature mixer 63b. The inphase mixer 63a is provided with the output 62 of the IF local oscillator 60. Referring to FIG. 2A, the output 62 of the IF local oscillator is phase shifted by $\pi/2$ by the phase shifter 61 providing the quadrature phase local oscillator signal 62b to the quadrature mixer 63b. Referring to FIG. 2A, the outputs of the mixers 63a,b are inputted to the low pass filters 66a and 66b respectively. The low pass filtered signals 67a,b are inputted to the analog to digital converters 68a and 68b respectively providing the digital inphase and digital quadrature phase baseband signals 69a $x_{I,n}(k)$ and 69b $x_{Q,n}(k)$ to the real to complex converter 72. The real to complex converter 72 provides the digital complex baseband signal 70n $x_n(k) = x_{I,n}(k) + j x_{Q,n}(k)$; $j=\sqrt{-1}$ at the output of the IF to baseband converter 65n.

Referring to FIG. 1, the state vector 70 $x(k)$ is inputted to the digital beamformers 75 blocks 1, . . . , M. The digital beamformers linearly combine the elements $x_1(k), \ldots, x_N(k)$ of the state vector $x(k)$ in an adaptive manner so as to create antenna beam nulls in the directions of the interference sources. All of the M digital beamformers introduce nulls in the direction of the interference sources, however, they may apply different adaptive algorithms for the nulling process and/or some of the beamformers may use the same class of algorithms but with different algorithm parameters. Application of different nulling algorithms may result in significantly different MBA gain pattern after the adaptation for the M digital beamformers 1, 2, . . . , M.

Referring to FIG. 1, the outputs 80 of the digital beamformers $z^1(k), \ldots, z^M(k)$ are inputted to the signal combiner block 95 for appropriately combining the signals at the outputs of the M digital beamformers. Referring to FIG. 1, the signals 80 $z_1(k), \ldots, z_M(k)$ are inputted to the polyphase analyzer 85 blocks 1, 2, . . . , M. Polyphase analyzer is a computationally efficient system for filtering/channelizing the input spectrum into K FFT channels that may correspond to the spectral bands allocated to K different users with the users' signals converted to the complex baseband. In a polyphase channelizer each of the K FFT channel has the same bandwidth. A user with a higher bandwidth requirement may be allocated multiple adjacent frequency slots corresponding to multiple FFT channels.

Referring to FIG. 1, the polyphase channelizer 85 outputs $u_n^1, u_n^2, \ldots, u_n^M$ are inputted to the weighted combiner 100n; n=1, . . . , K. Each of the M signals $u_n^1, u_n^2, \ldots, u_n^M$ at the input to the combiner 100n is a different version of the complex baseband signal of the user n with the difference arising from different MBA antenna gain of the M beamformers in the direction of the user n that results in a different receiver signal to noise plus interference power ratio among the M inputs to the weighted combiner 100n. Due to different weight vectors in the M digital beamformers arising from the fact that the number of degrees of freedom equal to the dimension of the weight vector is much higher than the number of interference sources to be nulled, the residual interference plus noise at the output of the M beamformers may be significantly uncorrelated. This results in the resulting noise plus interference associated with the M inputs to a weighted combiner 100n being significantly uncorrelated. By appropriate combination of the M signal inputs, a significant diversity gain can be achieved in terms of the reduction of the noise plus interference power at the combiner 100n output by employing various diversity combining techniques thereby achieving a higher signal to noise plus interference ratio at the weighted combiner output compared to the signal to noise plus interference ratios at the inputs to the weighted combiner.

In various embodiments of the invention, the weighted combiner may use a switched diversity scheme wherein the combiner selects the input with the maximum input signal to interference plus noise ratio by assigning a weight 1 to the input with the maximum input signal to interference plus noise ratio and weight 0 to all of the other (M−1) inputs. After the convergence of the adaptive digital beamformers, the residual interference power on all the M beamformer outputs is relatively insignificant compared to the noise power. With the weight vectors in the M beamformers all normalized to unit norm, the noise powers at the outputs of the M beamformers are equal and equal to the variance $\sigma^2$ of the noise at the outputs 70a, . . . , N of the IF to baseband converters 65. Therefore selection of the input with the maximum input signal to interference plus noise ratio form the M inputs to the weighted combiner 100n is equivalent to selecting the input with maximum total signal plus noise power. In case of uncorrelated noise and interference among various signals at the input of the weighted combiner 100, the signal to noise plus interference ratio (SNIR) at the weighted combiner output may be equal to the sum of the SNIR at the individual inputs to the weighted combiner 100n with the use of maximal ratio combining resulting in very significant diversity gain due to the multiple digital beamformers.

Referring to FIG. 1, the outputs 105 $u_1, \ldots, u_K$ of the weighted combiners 100 are inputted to the respective data demodulator 110 blocks $1, \ldots, K$ for the demodulation and detection of the various user data providing detected data outputs 115 $\hat{d}_1, \hat{d}_2, \ldots, \hat{d}_K$. The data demodulator 110 blocks may also include a low pass filter to eliminate any out of band noise or interference before the demodulation and detection operation.

In various embodiments of the invention that use polyphase channelizer for channelization, any user c allocated κ number of bandwidth slots, the corresponding κ output signals 105 at the weighted combiner 100 are selected by the channel selector block 118. The κ outputs 105 selected by the channel selector 118 are inputted to the polyphase synthesizer block 120 that translates the spectrum of the κ inputs 119 such that the translated spectrum of the κ inputs 119 occupy adjacent frequency slots and combines these translated signals to provide the composite baseband signal 125 $u_c$ at the output of the polyphase synthesizer block 120. The composite baseband signal at the output of the polyphase synthesizer block 120 is inputted to the data demodulator block 130 for filtering, demodulation and detection providing the detected data 135 $\hat{d}_c$ for the user n that has allocation of multiple κ frequency slots at the output of block 130. In various embodiments of the invention there may be multiple number of users allocated with different number of frequency slots wherein the composite baseband signal for each such user is generated and detected with the use of channel selector, polyphase synthesizer block and the data demodulator block as in the generation of data $\hat{d}_c$ for the user c allocated with κ frequency slots.

The multiplicity κ channels allocated to a single user c all have the same physical location and thus the weighted combiner weight vectors of the corresponding κ weighted combiners 100 may be the selected to be equal and therefore, splitting the spectrum of user c by the polyphase analyzer 85 into κ channels and combing the corresponding κ outputs form the weighted combiner 100 output 105 may not result in any discontinuity due to different signal gain experienced by different components of the split spectrum of the composite user c. Furthermore any impact due to the filtering operations in the polyphase analyzer 85 and synthesizer 120 in terms of introduction of any possible discontinuity in the spectrum at the boundaries of the adjacent κ multiple channels in the composite signal 125 $u_c$ can be eliminated by the use of generalized polyphase channelizer taught by Kumar in "Generalized Polyphase Channelization System, U.S. Pat. No. 7,403,577, issued Jul. 22, 2008," incorporated by reference with this application. In various other embodiments of the invention, the κ channels corresponding to the composite user c may be combined at the output of the polyphase analyzer 85 $1, 2, \ldots, M$ with M polyphase synthesizers and the M composite signals inputted to the weighted combiner that provides the composite baseband signal to the data demodulation block 130. In various other embodiments of the invention, various methods other than the polyphase analyzer method may be used for the channelization operation wherein in some of these methods, the bandwidth allocated to different users may be different. However, the alternative channelization methods may also have a higher computational requirement then the polyphase analyzer/synthesizer method. Non limiting examples of such alternative methods are the frequency domain filtering method, analytical signal method, multistage and hybrid techniques.

Figure 3:
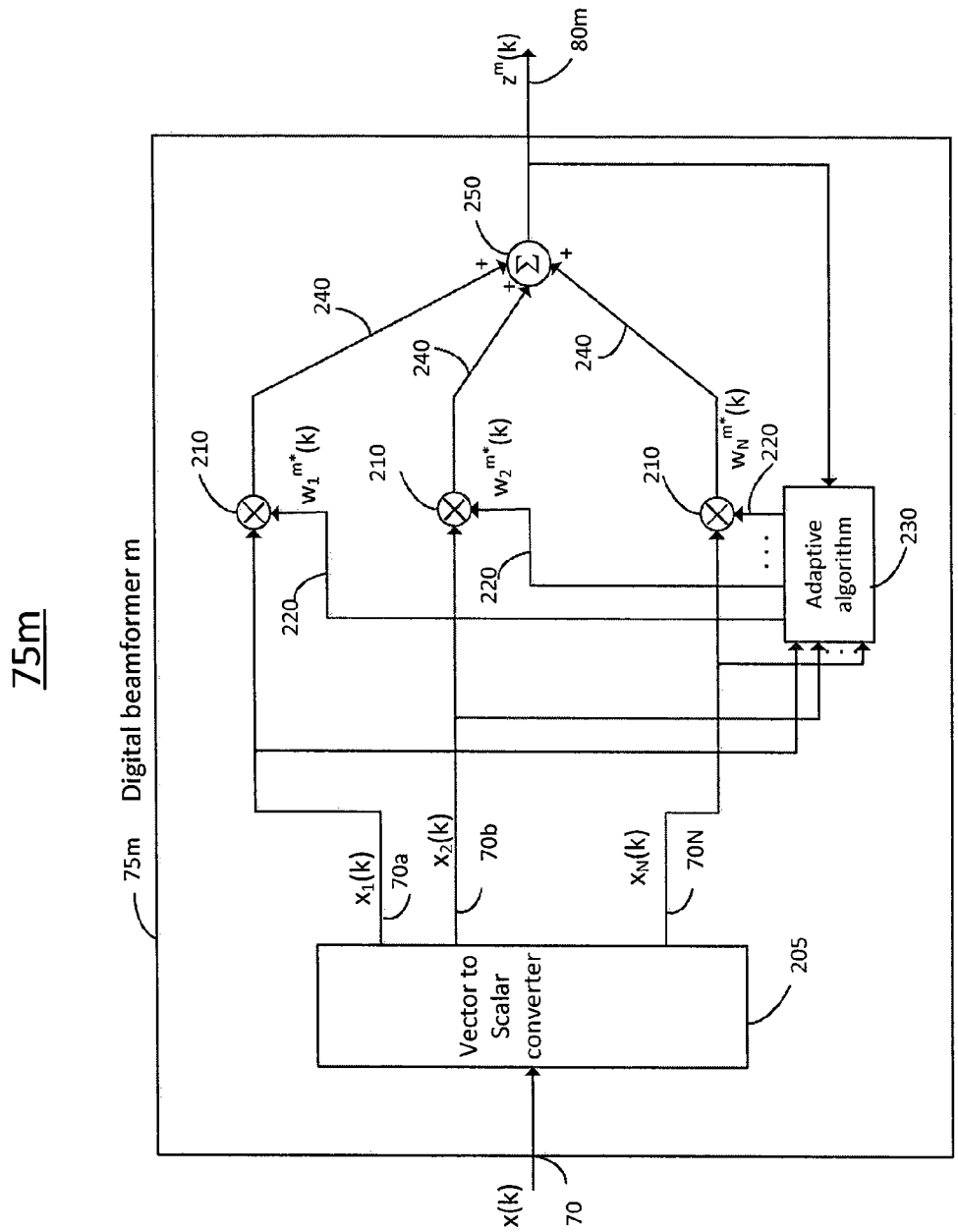
FIG. 3 shows a block diagram of one embodiment of digital beamformer.

FIG. 3 shows the block diagram of the digital beamformer 75m of FIG. 1. Referring to FIG. 3, the state vector 70 x(k) is inputted to the vector to scalar converter 205. The digital complex baseband signals $70a, \ldots, N\ x_1(k), x_2(k), \ldots, x_N(k)$ at the output of the vector to scalar converter 205 are inputted to the multipliers 210. The multipliers multiply the signals $x_1(k), x_2(k), \ldots, x_N(k)$ by the respective conjugates of the complex weights 220 $w_1^{m*}, w_2^{m*}, \ldots, w_N^{m*}$, with * denoting the complex conjugate, provided by the adaptive algorithm block 230. The weighted complex baseband signals 240 at the output of the multipliers 210 are added by the adder 250 providing the digital beamformer output 80m $z^m(k)$. Referring to FIG. 3, the digital complex baseband signal 70 $x_1(k), x_2(k), \ldots, x_N(k)$ and the digital beamformer output 80m $z^m(k)$ are both inputted to the adaptive algorithm block 230 so as to adapt the beamformer weights $w_1^m, w_2^m, \ldots, w_N^m$ for introducing MBA antenna pattern nulls in the direction of the interfering sources.

The adaptive algorithm of block 230 in FIG. 3 may select the weight vector $w = [w_1^m\ w_2^m\ \ldots\ w_N^m]^T$, with T denoting transpose, so as to minimize the power $J_1$ at the combiner 250 output according to $$\text{Min } J_1 = E[|z^m(k)|^2] = w^H R w; R = E[x(k)x^H(k)] \quad (1)$$

$$\text{Subject to } d_S^H w = 1 \quad (2)$$

In (1) E denotes the expected value operator, superscript H denotes the conjugate transpose operation and $x = [x_1\ x_2\ \ldots\ x_N]^T$, and in (2) $d_s$ denotes the steering vector. In (1) and (2) it is implicitly assumed that there are no desired signal sources other than in the direction corresponding to the steering vector, which may be equal to $[1\ 1\ \ldots\ 1]^T$, or the power levels from any of the desired signal sources is sufficiently small relative to the interference or jammer power.

Referring to FIG. 1, in various embodiments of the invention the digital beamformers $75a,b, \ldots, M$ may use different adaptive algorithms that may be selected, for example, from the set of algorithms including the state matrix inversion (SMI), recursive least squares (RLS), correlation feedback (CF), quantized state 1 (QS1), quantized state 2 (QS2), quantized state 1 with constraints (QC1), quantized state 2 with constraints (QC2), generalized versions of the QC1 and QC2 algorithms involving multiple thresholds referred to as QCG1 and QCG2 algorithms, or any other similar adaptive algorithms. In various embodiments of the invention, more than one digital beamformers may use the same adaptive algorithm with different algorithm parameters.

In the minimization in (1) and (2), the signal sources may be turned off during the adaptation phase, otherwise the beamformer may also place nulls in the direction of the desired signal sources as well. In the period following the adaptation phase, the beamformer weights are not perturbed and the desired signal sources are turned on. The disadvantage of such a strategy is that it may not be possible to null the interference from blinking jammers. The quantized state algorithms may provide some shielding of the signal sources from the adaptation algorithm. The SMI algorithm obtained from the minimization in (1) and (2) with a quadratic constraint given by $$w^H w \leq \delta \quad (3)$$

results in the following non recursive version of the SMI algorithm $$w_{SMI} = \frac{(R+\varepsilon I)^{-1}d_S}{d_S^H(R+\varepsilon I)^{-1}d_S} \quad (4)$$

In (3) δ is some small positive scalar and ε in (4) is an implicit function of δ. Relatively higher values of ε result in reduced interference rejection capability but may provide some gain in the direction of the signal sources with relatively small power levels that are turned on during the adaptation phase. AS the signal to noise plus interference ratio (SNIR) is not changed by an arbitrary scaling of the weight vector, the denominator in (4) may be dropped. Replacing the matrix R by its estimate $\hat{R}(k)$, the recursive version of the SMI algorithm is given by $$\hat{R}(k)=\lambda\hat{R}(k-1)+(1-\lambda)x(k)x^H(k)+(1-\lambda)\varepsilon I; k=1,2, \quad (5a)$$

$$w_{SMI}(k)=\alpha\hat{R}^{-1}(k)d_S \quad (5b)$$

In (5) λ is with 0<λ≤1 is the exponential data weighting coefficient determining the effective length of time interval over which $x(k)x^H(k)$ is averaged in the estimation of $\hat{R}(k)$, and α is selected to make the norm of $w_{SMI}(k)$ equal to 1. In (5), $\hat{R}(0)$ may be selected equal to εI where I denotes the identity matrix and c is some small positive scalar.

In situations where a pilot signal form a desired signal source is available, an unconstrained adaptive algorithm for the estimation of the weight vector may be obtained by minimization of the following optimization index $J_2$ $$J_2=E[|s(k)-w^Hx(k)|^2] \quad (6)$$

In (6) s(k) is the pilot signal to be tracked by the digital beamformer. The least squares algorithm obtained by minimization of $J_2$ is given by $$w_{LS}(k)=R^{-1}r_{xs}; r_{xs}=E[x(k)s^*(k)] \quad (7)$$

With the steering vector for the signal source given by $d_s$, the state vector x(k) is given by $$x(k)=d_Ss(k)+I(k)+n(k) \quad (8)$$

In (8) n(k) and I(k) denotes the spatial noise vector and the interference vector respectively present at the output of the RF to baseband conversion subsystem 15 and substitution of the expression for x(k) in 7) in the following expression for $r_{xs}$.

$$r_{xs}=E[s(k)s^*(k)]d_S \quad (9)$$

As both n(k) and I(k) are uncorrelated with s(k). Substitution of (9) in (7) results in an expression for $w_{LS}(k)$ that is similar to $w_{SMI}(k)$ in (5b).

In various other implementations of the invention, the adaptive algorithm in the digital beamformer of FIG. 2 may be the exponentially data weighted recursive least squares algorithm given by (10).

$$w_{u,RLS}(k)=w_{u,RLS}(k-1)+\hat{R}_I(k)x(k)[s(k)-w_{u,RLS}^H(k-1)x(k)]^* \quad (10a)$$

$$\hat{R}_I(k)=\lambda^{-1}[\hat{R}_I(k-1)-\hat{R}_I(k-1)x(k)(x^H(k)\hat{R}_I(k-1)x(k)+\lambda)^{-1}x^H(k)\hat{R}_I(k-1)] \quad (10b)$$

$$w_{RLS}(k)=\alpha w_{u,RLS}(k); \alpha=1/|w_{u,RLS}(k)| \quad (10c)$$

In (10c) the scalar α normalizes the norm of the weight vector $w_{RLS}(k)$ to 1, and $\hat{R}_I(k)$ in (10a,b) is equal to a scalar that is a function of k times the inverse of the matrix $\hat{R}(k)$ in (5a) with ε=0 and λ with 0<λ≤1 is the exponential data weighting coefficient that determines the effective length of the time period over which $x(k)x^H(k)$ is averaged to evaluate $\hat{R}_I(k)$.

An alternative version of the RLS algorithm for the case wherein, instead of the known pilot signal, the steering vector d is specified is given by $$w_{RLS}(k)=\alpha\hat{R}_I(k)d_S \quad (11)$$

In (11) the scalar α is selected so as to reduce the norm of the weight vector equal to 1.

In various other embodiments of the invention, the correlation feedback algorithm may be used in the digital beamformer of FIGS. 1, 3 wherein the weight vector w is decomposed as $$w=w_c+w_o; w_c=d_S/(d_S^Hd_S) \quad (12)$$

with $w_c$ denoting the component that is equal to a scalar times the steering vector d and with $w_o$ denoting the component of w that is orthogonal to the vector d selected so as to optimize the index $J_1$ in (1) and is given by $$w_{u,CF}(k)=w_c+\tilde{P}_c[w_{u,CF}(k-1)-\mu\hat{R}(k)w_{u,CF}(k-1)] \quad (13a)$$

$$\tilde{P}_c=I-d_S(d_S^Hd_S)^{-1}d_S^H; \tilde{P}_cw_c=0 \quad (13b)$$

In (13) $\hat{R}(k)$ is given by 5(a), $\tilde{P}_c$ is the projection operator and μ is a positive scalar selected to be sufficiently small so as to ensure convergence of the algorithm.

In various embodiments of the invention, the digital beamformers 75 in FIG. 1 may use the various quantized state algorithms. The quantized state algorithms are obtained as a result of projection of the weight vector w(k−1) on to the hyper plane $H_k$ in the weight vector space given by $s(k)-w^Hx(k)=0$ so as to minimize the weighted norm square $$\|w(k-1)-w_H(k)\|_{B(k)}^2; w_H(k)\in H_k \quad (14)$$

with respect to a positive semi definite matrix B(k) resulting in a point $w_H(k)$ on the hyper plane $H_k$ and then evaluating the center of mass of the weight vectors $w_H(1), \ldots, w_H(k)$ with respect to a positive semi definite matrix $\bar{B}(k)$. With the selection of the matrices $B(k)=x(k)x^H(k)$ and $\bar{B}(k)=x(k)x^{qH}(k)+x_q(k)x^H(k)$ result in the following QS1 algorithm.

$$w_{u,QS1}(k)=w_{u,QS1}(k-1)+\gamma(k)P_I^q(k)x^q(k)[s(k)-w_{u,QS1}^H(k-1)x(k)]^* \quad (15a)$$

$$P_I^q(k)=\lambda^{-1}[P_I^q(k-1)-P_I^q(k-1)x^q(k)(x^H(k)P_I^q(k-1)x^q(k)+\lambda)^{-1}x^H(k)P_I^q(k-1)] \quad (15b)$$

$$w_{QS1}(k)=\alpha w_{u,QS1}(k); \alpha=1/|w_{u,QS1}(k)| \quad (15c)$$

In (15) γ(k) is a scalar that may be selected to be some constant that is sufficiently small to ensure convergence of the algorithm, and $x^q(k)$ is the quantized state vector.

Alternatively the weight vector $w_{QS1}$ in terms of the steering vector d is given by $$P^q(k)=\lambda P^q(k-1)+(1-\lambda)x^q(k)x^H(k)+(1-\lambda)\varepsilon I \quad (16a)$$

$$w_{QS1}(k)=\alpha P_I^q(k)d_S; P_I^q(k)=[P^q(k)]^{-1} \quad (16b)$$

In (16b) α is the selected to normalize the weight vector to unit norm. In (15)-(16) the quantized state vector $x^q(k)$ is obtained by a component wise quantization of the state vector x(k).

The real and imaginary components of the $j^{th}$ component of the vector $x^q(k)$ in (15)-(16), denoted by $x_j^q(k)$ are given by $$Re(x_j^q(k))=D[Re(x^q(k))]; Im(x_j^q(k))=D[Im(x^q(k))] \quad (17a)$$

In (17) Re(z) and Im(z) denote the real and imaginary parts respectively of z for any complex variable z and D(x) for any real x is the threshold function given by $$D(x) = \begin{cases} 1; & x \geq V_t \\ -1; & x < -V_t \\ 0; & \text{otherwise} \end{cases} \quad (17b)$$

where in (17b) $V_t$ is an appropriately selected threshold with $V_t > 0$. The threshold value may, for example, be selected equal to some multiple of estimates of the square root of the desired signal power at the feeder output when the digital beamformer adaptation is performed without turning off signal sources with their power levels are relatively small compared to the power levels of the interference sources. The threshold $V_t$ to a certain extent shields the desired signals from the adaptive nulling algorithm in the digital beamformer.

Another version of the QS1 algorithm that may be used in the various embodiments of the invention is given by $$w_{u,QS1}(k) = w_{u,QS1}(k-1) + \quad (18a)$$
$$\gamma(k)P_I^q(k)\left[x^q(k) + \frac{x^{qH}(k)x(k)}{x^q(k)x(k)}x(k)\right] \times [s(k) - w_{u,QS1}^H(k-1)x(k)]^*$$

$$P^q(k) = \quad (18b)$$
$$\lambda P^q(k-1) + (1-\lambda)x^q(k)x^H(k) + (1-\lambda)x(k)x^{qH}(k) + (1-\lambda)\varepsilon I$$

$$w_{QS1}(k) = \alpha w_{u,QS1}(k); \alpha = 1/|w_{u,QS1}(k)|; P_I^q(k) = [P^q(k)]^{-1} \quad (18c)$$

In (18a) the matrix $P_I^q(k)$ may be updated directly without requiring the matrix inversion with the application of the matrix inversion lemma to the update in (18b).

In various embodiments of the invention one or more of the digital beamformers 75 in FIG. 1 may use the QS2 adaptive algorithm obtained by replacing $P_I^q(k)$ in (15) by $P_I^{qq}(k)$ and given by $$w_{u,QS2}(k) = w_{u,QS2}(k-1) + \gamma(k)P_I^{qq}(k)x^q(k)[s(k) - w_{u,QS2}^H(k-1)x(k)]^* \quad (19a)$$

$$P_I^{qq}(k) = \lambda^{-1}[P_I^{qq}(k-1) - P_I^{qq}(k-1)x^q(k)(x^q(k)P_I^{qq}(k-1)x^q(k)+\lambda)^{-1}x^q(k)P_I^{qq}(k-1)] \quad (19b)$$

$$w_{QS2}(k) = \alpha w_{u,QS2}(k); \alpha = 1/|w_{u,QS2}(k)| \quad (19c)$$

In cases wherein the number of interference sources is greater than 1, the threshold function $D(x)$, x real in (17) used to quantize the state vector $x(k)$ in the generalized quantized state (GQS) algorithms may be replaced by the threshold function $D_m(x)$ with multiple thresholds given by $$D_m(x) = V_i \text{sgn}(x); V_{t_i} \leq |x| < V_{t_{i+1}}; i = 0,1,\ldots,N_t \quad (20)$$

where $N_t$ is the number of thresholds, $V_{t_i}$, $i=1, 2, \ldots, N_t$ are the $N_t$ input thresholds with $V_{t_i}$ for $i = N_t+1$ equal to $\infty$, and $V_i$ are the output levels of the threshold function $D_m(x)$.

The input threshold levels $V_{t_i}$ and the output levels $V_i$ in (20) are some progressively increasing positive numbers possibly based on the average power levels $P_j$ of the feed outputs $x_j(k)$; $j=1, 2, \ldots, N$. In some of the various embodiments of the invention, the N power levels $P_j$ are arranged in an increasing order and divided into $N_t$ groups wherein the power levels within each group differ by less than $\Delta$ dB for some relatively small value for $\Delta$, for example, $\Delta$ may be selected equal to 3 dB. The power levels of the first group may be selected to be equal to the sum of the power of the spatially white noise arising in the RF to baseband conversion subsystem 15 and the expected power level due to the relatively small signal power sources distributed over the coverage area that may be transmitting during the adaptive nulling process. Denoting by $P_1, P_2, \ldots, P_{Nt}$ the power level equal to the maximum of the power levels in each of the $N_t$ groups, then the threshold levels may be determined as follows. With $V_{t_0}=0$ and $V_{t_j}=\alpha_q\sqrt{P_j}$, $\alpha_q \approx 3$, $j=1, 2, \ldots, N_t$, $V_{t_j}=\infty$ for $j=N_t+1$, $V_0=0$, $V_1=1$, and $$V_j = \beta_q\sqrt{(P_j/P_1)}; j \geq 2 \quad (21)$$

The computed value of $V_j$ from (21) may be rounded off to, for example, a power of 2 and $\beta_q$ is some positive constant that may be selected equal to ⅓. With $V_0=0$, the impact of the distributed and relatively small signal power sources is minimized on the adaptive nulling algorithm thus providing a shielding effect on the desired signals from the nulling algorithm.

The grouping or the partitioning of the power levels $P_j$, $j=1, 2, \ldots, N$ in (21) may be accomplished by first dividing the power levels in dBW by $\Delta$ and rounding off the result to the nearest integer value. The power levels with the same rounded off values are then grouped into the same group. For example, with the power levels equal to [−31, −21.5, −19.7, −10.5] dBW and with $\Delta=3$ dB, the division of the power levels by $\Delta$ and rounding off the result to the nearest integer values results in [−10, −7, −7, −3]. As the second and third elements of the set are both equal to −7, the corresponding power levels belong to the same group, resulting in the partition of the power levels given by {−31}, {−21.5, −19.7}, and {−10.5} dBW.

In various embodiments of the invention, the state vector $x(k)$ may be transformed by an orthonormal matrix $Q_d$ that may be equal to the eigenvector matrix of the covariance matrix R with the normal form of R given by $$R = Q_d \Lambda Q_d^H; x_d(k) = Q_d^H x(k); Q_d^{-1} = Q_d^H \quad (22)$$

In (22) the diagonal matrix $\Lambda$ is the eigenvalue matrix of R with the correlation matrix of $x_d(k)$ given by $E[x_d(k)x_d^H(k)] = \Lambda$ resulting in the components of $x_d(k)$ being uncorrelated. Applying the QS1 algorithm to the transformed state vector $x_d(k)$ and denoting by $x_d^q(k)$ the quantized version of the state vector $x_d(k)$ results in the following transformed state version of QS1 algorithm TQS1.

$$w_{u,TQS1}(k) = w_{u,TQS1}(k-1) + \gamma(k)P_{d,I}^q(k)x_d^q(k)[s(k) - w_{u,TQS1}^H(k-1)x_d(k)]^* \quad (23a)$$

$$P_{d,I}^q(k) = \lambda^{-1}[P_{d,I}^q(k-1) - P_{d,I}^q(k-1)x_d^q(k)(x_d^H(k)P_{d,I}^q(k-1)x_d^q(k)+\lambda)^{-1}x_d^H(k)P_{d,I}^q(k-1)] \quad (23b)$$

$$w_{TQS1}(k) = \alpha w_{u,TQS1}(k); \alpha = 1/|w_{u,TQS1}(k)| \quad (23c)$$

A transformed state version of the QS2 algorithm TQS2 is similarly given by $$W_{u,TQS2}(k) = w_{u,TQS2}(k-1) + \gamma(k)P_{d,I}^{qq}(k)x_d^q(k)[s(k) - w_{u,TQS2}^H(k-1)x_d(k)]^* \quad (24a)$$

$$P_{d,I}^{qq}(k) = \lambda^{-1}[P_{d,I}^{qq}(k-1) - P_{d,I}^{qq}(k-1)x_d^q(k)(x_d^q(k)P_{d,I}^{qq}(k-1)x_d^q(k)+\lambda)^{-1}x_d^q(k)P_{d,I}^{qq}(k-1)] \quad (24b)$$

$$w_{TQS2}(k) = \alpha w_{u,TQS2}(k); \alpha = 1/|w_{u,TQS2}(k)| \quad (24c)$$

In various embodiments of the invention one or more digital beamformers 75 in FIG. 1 may use the constrained quantized state projection algorithm CQ2. In the CQ2 algorithm the adjustment in the weight vector is constrained to lie in the state space orthogonal to the vector $d_s$ with initial estimate of the weight vector given by a scaled version of the vector $d_s$ equal to $w_c = d_s/(d_s^H d_s)$ and the weight update algorithm given by $$w_{u,CQ2}(k) = w_c + \tilde{P}_c[w_{u,CQ2}(k-1) - \mu(k)T^{-1}(k)x^q(k)z^*(k)] \quad (25a)$$

$$T(k) = \lambda T(k-1) + (1-\lambda)x^q(k)x^{qH}(k) + (1-\lambda)\varepsilon I; T(0) = \varepsilon I \quad (25b)$$

$$z(k)=w_{u,CQ2}{}^H(k-1)x(k); \tilde{P}_c=I-d_S(d_S{}^H d_S)^{-1}d_S{}^H; \tilde{P}_c w_c=0 \quad (25c)$$

$$w_{CQ2}(k)=\alpha w_{u,CQ2}(k); \alpha=1/|w_{u,CQ2}(k)| \quad (25d)$$

In (25a) $\mu(k)$ is in general a time varying positive scalar selected so as to adjust the convergence rate of the algorithm and $\epsilon$ in (25b) is some relatively small positive scalar.

Another constrained quantized state algorithm CQ1 is given by $$w_{u,CQ1}(k)=w_c+\tilde{P}_c[w_{u,CQ1}(k-1)-\mu(k)T^{-1}(k)x^q(k)\bar{z}^*(k)] \quad (26a)$$

$$\bar{z}(k)=w_{u,CQ1}{}^H(k-1)x^q(k); \tilde{P}_c=I-d(d^H d)^{-1}d^H; \tilde{P}_c w_c=0 \quad (26b)$$

$$w_{CQ1}(k)=\alpha w_{u,CQ1}(k); \alpha=1/|w_{u,CQ1}(k)| \quad (26c)$$

In (26a) the matrix T(k) is updated according to (25b). The QC1 and QC2 algorithms wherein the quantized state vector is based on the multiple threshold function $\Delta_m(x)$ in (20) are termed in the description of the invention as the GCQ1 (generalized QC1) and GQC2 (generalized QC2) algorithms. The QC1 and QC2 algorithms due to the threshold function in the quantization of the state vector x(k) shield at least partially the signal sources with their power levels $P_1$ corresponding to the first threshold level $V_{t1}$ in the threshold function D( ) in (20) from the adaptive nulling algorithm. Thus the adaptation may be performed without turning off the desired signal sources with relatively small power levels in a dynamic or blinking jammer scenario. However, the adaptive algorithm may result in the nulling of signal sources with relatively higher power levels and these may have to be turned off during the process of adaptation, making it more difficult to mitigate interference in the dynamically changing interference environment.

In various other embodiments of the invention the projection based algorithms including the QC1 and QC2 algorithms may be generalized to the case of multiple steering vectors corresponding to multiple signal sources with relatively large signal power levels. For the case of $N_S$ signal sources with relatively large power levels relative to the threshold $V_{t1}$, and with the corresponding steering vectors equal to the $N \times N_S$ matrix $Q_S$ is considered wherein there are $N_I$ interference sources with their direction vectors represented by the columns of the $N \times N_I$ dimensional matrix $Q_I$.

The subspace of the vector subspace spanned by the columns of $Q_S$ that is orthogonal to the subspace spanned by the columns of the matrix $Q_I$ is given by subspace spanned by the columns of the matrix Q given by $$Q=Q_S-Q_I(Q_I{}^H Q_I)^{-1}Q_I{}^H Q_S \quad (27)$$

where in (27) the rank of the matrix $Q_I$ is $N_I$ so that the matrix $Q_I{}^H Q_I$ is nonsingular. In case the rank of the matrix $Q_I$ is smaller than $N_I$, the number of columns of $Q_I$ can be reduced by, for example, using the Gram Schmidt orthogonalization procedure resulting in the number of columns equal to the rank of the matrix with reduced columns. In (27) the rank of the matrix Q may be smaller than $N_S$, in which case the number of columns of Q are reduced by the Gram Schmidt orthogonalization procedure resulting in the matrix $Q_m$ with independent columns.

In case wherein the direction vectors of the interference sources are orthogonal to those of the signal power sources, the matrix Q is equal to $Q_S$ as $Q_I{}^H Q_S=0$ and $Q_m=Q$. From the matrix $Q_m$, the projection matrix $\tilde{P}_c$ is given by $$\tilde{P}_c=I-Q_m(Q_m{}^H Q_m)^{-1}Q_m{}^H \quad (28)$$

The CQ1 and CQ2 algorithms for the case of multiple steering vectors are given by (25), (26) with $\tilde{P}_c$ given by (27) and (28) and with the vector $w_c$ constrained to lie in the subspace spanned by $Q_m$, wherein the vector $w_c$ may be selected as $$w_c=Q_m[1\ 1\ \ldots\ 1]^T \quad (29)$$

The matrix $Q_I$ in (27) may be obtained in an initial step wherein adaptation is performed with transmission from relatively large power signal sources turned off to determine the location of the interference sources with further adaptation performed with the transmission of the signal sources turned on to adapt to the dynamic interference conditions. Alternatively, the locations of all the interference and signal sources can be determined with all the signal sources turned and the signal sources identified by some additional means from the totality of the interference and signal sources determined by the adaptive algorithm. Any additional sources that are turned on after the initial phase are also nulled during the adaptation phase if their steering vectors are not in the subspace spanned by $\tilde{P}_c$.

In various other embodiments of the invention, the steering vectors of the relatively high power signal sources and the interference sources may be determined from the normal form of the covariance matrix R of the state vector x(k) given by (22). The subspace spanned by the columns of the matrix $Q_d$ in (22) corresponding to the dominant eigenvalues given by the elements of the eigenvalue matrix $\Lambda$ in (22) contains the direction vectors of the sources with relatively large power.

In phased array antenna without adaptation, a relatively narrow beam is steered in the direction of the desired signal source within the coverage area defined by the extent of the scan angle of the phased array antenna by introducing a relative phase difference among the outputs of the various feeds in the array. In adaptive nulling phased array antenna, the outputs of the various feeds are weighted by complex weights. The weighted outputs are summed to provide the digital beamformer output and the weights are adapted so as to introduce a null in the direction of the source of interference while tracking a signal from the desired signal source. Multiple signal sources are tracked with different beamformers. However, if the multiplicity of sources that are possibly in different geographical location but are transmitting in different frequency slots in the FDMA mode or at different codes in the CDMA multiple accessing systems, the signals from such multiple sources may be received by a single digital beamformer with one of the various embodiments of the invention.

A diversity gain may be achieved by combining the signals from multiple digital beamformers. Referring to FIG. 1, as an example of M=4 digital beamformers with K different desired signal sources transmitting in different bandwidth slots, one of the four digital beamformers may receive signals from κ=3 signal sources with indices (1, 2, 3) with the other three digital beamformers receiving signals from the sources given with indices (1, 3, 4), (2, 3, 4) and (1, 2, 4) respectively and appropriately combining these signals in the signal combiner block 95 of FIG. 1 achieving triple diversity gain.

In various embodiments of the invention for the phased array antenna system, a single digital beamformer may adjust the beamformer weights by minimizing the index $$J_3=E[|s_1(k)-w^H x(k)|^2]+\ldots+E[|s_\kappa(k)-w^H x(k)|^2] \quad (30)$$

wherein $s_1(k), s_2(k), \ldots, s_\kappa(k)$ are the pilot signals form the signal sources with indices 1, 2, . . . , κ, with respect to the weight vector w. Minimization of (22) with respect to w results in the following solution $$w = \kappa^{-1} R^{-1} \sum_{j=1}^{K} r_{xs_j}; \; r_{xs_j} = E[x(k)s_j^*(k)]; \; R = E[x(k)x^H(k)] \quad (31)$$

The cross correlation function may be determined as $$r_{xs_j} = E[s_j(k)s_j^*(k)]d_{Sj} \quad (32)$$

wherein $d_{Sj}$, j=1, 2, . . . , κ are the steering vectors.

A recursive least squares algorithm for the minimization of the time average version of $J_3$ in (30) is given by $$w_{u,RLS}(k) = w_{u,RLS}(k-1) + \hat{R}_I(k)x(k) \begin{bmatrix} \frac{1}{\kappa}\sum_{j=1}^{K} s_j(k) - \\ w_{u,RLS}^H(k-1)x(k) \end{bmatrix}^* \quad (33a)$$

$$\hat{R}_I(k) = \lambda^{-1}[\hat{R}_I(k-1) - \hat{R}_I(k-1)x(k)(x^H(k)\hat{R}_I(k-1)x(k) + \lambda)^{-1} x^H(k)\hat{R}_I(k-1)] \quad (33b)$$

$$w_{RLS}(k) = \alpha w_{u,RLS}(k); \; \alpha = 1/|w_{u,RLS}(k)| \quad (33c)$$

In various other embodiments of the invention for the case of phased array antenna system the weight vector may be estimated by $$w_{RLS}(k) = \alpha \hat{R}_I(k)Q_S[E(|s_1(k)|^2) \ldots E(|s_K(k)|^2)]^T; Q_S = [d_{S1}d_{S2} \ldots d_{SK}]^T \quad (34a)$$

$$R(k) = \lambda R(k-1) + (1-\lambda)x^q(k)x^H(k) + (1-\lambda)\epsilon I; R_I(k) = R^{-1}(k) \quad (34b)$$

Quantized state algorithms for the case of phased array antenna may be obtained by replacing some of the x(k) terms in (33), (34) by the quantized version $x^q(k)$ as in (15) and (16).

Referring to FIG. 1, the outputs 80 $z^m(k)$ of the digital beamformer 75m is inputted to the polyphase analyzer 85m. The polyphase analyzer is a computationally efficient channelizer architecture for band pass filtering the signals occupying K adjacent frequency slots in the input signal $z^m(k)$ and simultaneously translating the spectrum of the K signals to the center frequency equal to 0 providing the complex baseband signals 90 $u_1^m(k), \ldots, u_K^m(k)$ at the output of the polyphase analyzer 85m. For the critically sampled case, the polyphase analyzer is comprised of a demultiplexer that provides K outputs each at a sample rate equal to $R_w/K$ sps (samples per second) wherein $R_w$ is the sample rate of the input signal $z^m(k)$ and the rate decimation factor is equal to K. The K low rate signals at the output of the demultiplexer are inputted to a bank of polyphase filters with the filter outputs inputted to a K×K FFT (Fast Fourier Transform) block. The outputs of the DFT block are the channelized signals $u_1^m(k), \ldots, u_K^m(k)$ also referred to as the K FFT channel outputs. The polyphase channelizer effectively band pass filters the K user signals and translates all of the K band pass filtered signals to the complex baseband in a computationally efficient manner wherein the K band pass filters have non overlapping pass bands. The polyphase channelizers for the critically sampled case for wideband signals are taught by Kumar in, "Polyphase Channelization system, U.S. Pat. No. 7,145,972, Dec. 5, 2006," incorporated by reference with this patent application.

A computationally efficient polyphase channelizer for the case wherein the various users have different bandwidth allocation is taught, by Kumar in, "Generalized Polyphase Channelization System, U.S. Pat. No. 7,403,577, issued Jul. 22, 2008," incorporated by reference with this application, wherein any of the users may be allocated multiple adjacent FFT channels and there is introduced an intentional overlap among the frequency response of the K bandpass filters by selecting the rate decimation that is smaller than K, such that a user may be provided a seamless spectral band of desired bandwidth.

In various alternative embodiments of the invention, channelization methods other than polyphase channelizer may be used. Non limiting examples of such methods are the analytical signal method, frequency domain filtering method, multistage tree method and the hybrid methods.

Referring to FIG. 1, the outputs 90a through 90M $u_n^1, \ldots, u_n^M$ of the polyphase analyzer 85m, m=1, 2 . . . , M are inputted to the weighted combiner 100-n for n=1, 2, . . . , K. The weighted combiner 100-n selects a set of $\kappa_n$ inputs with $\kappa_n \leq M$ from the M inputs and weighs the selected inputs with the complex weights $\psi_n^j$, j=1, 2, . . . , $\kappa_n$ and sums the weighted inputs providing the $n^{th}$ user signal $u_n$ at the combiner 100-n output for n=1, 2, . . . , K according to (35) providing a diversity gain of order $\kappa_n$.

$$u_n(k) = \sum_{j=1}^{\kappa_n} \Psi_n^j(k)u_n^j(k) \quad (35)$$

The digital beamformers 1, 2 . . . , M may have different antenna gain patterns after the weight vectors of the adaptive nulling algorithms have converged to their quiescent values and the beamformer output corresponding to the maximum antenna gain in the direction of the user n may be selected for maximizing the signal to noise plus interference ratio at the output of the weighted combiner n. In the FDMA system, the users at different locations have different frequency band allocations due to the intrinsic characteristics of the FDMA system, therefore selection of the input with the highest antenna gain at the user location is achieved by selecting the input with the maximum signal power from the $\kappa_n$ inputs to the weighted combiner. Such a selection also maximizes the output signal to noise ratio if the noise power at the various inputs to the weighted combiner is equal.

After the adaptive algorithms in the digital beamformers 75 1 through M have achieved convergence, the residual interference due to any jammers may be relatively insignificant compared to the beamformer output noise due to the spatially uncorrelated noise at the outputs of the RF BPF/AMP blocks 30 1 through N of FIG. 1. With $\sigma_n^2$ denoting the variance of the complex baseband noise appearing at the outputs of the IF to baseband converters 65 corresponding to the spatially uncorrelated RF noise at the output of blocks 30, the variance of the noise $n_{o,m}(k)$ at the output of the digital beamformer 75m is given by $\sigma_{o,m}^2 = \|w^m\|^2 \sigma_n^2$ where $w^m$ denotes the weight vector of the digital beamformer m. As the various adaptive algorithms used in the digital beamformers 75 normalize the norm of the vector $w^m$ to 1, the noise variance $\sigma_{o,m}^2$ at the outputs of the beamformers 75-1 through M are all equal to $\sigma_n^2$. Furthermore, the variance of the noise in any specific frequency band is also equal among the outputs of the digital beamformers resulting in equal noise variance among all the inputs inputted to any one of the K weighted combiners 100. Thus selection of the input with maximum signal to noise ratio in the weighted combiner 100 is accomplished by selecting the input with the maximum signal plus noise power that may be estimated from the samples of the signals $u_n^m$.

In one of the various embodiments of the invention, the weight $\psi_n^{m_0}$ in (35) with the index $m_0$ corresponding to the maximum total signal plus noise power among the M inputs to the weighted combiner 100-$n$ is set equal to 0 with the remaining weights set equal to 0. The input signal plus noise power at the $m^{th}$ input may be estimated by the time average $P_n^m$ given by $$P_n^m(k)=\lambda P_n^m(k-1)+(1-\lambda)|u_n^m(k)|^2; k=1,2, \tag{36}$$

In (36) the parameter $\lambda$ with $0<\lambda<1$ determines the effective averaging interval in the estimation of the power $P_n^m$ from the signal samples $u_n^m$.

The weight vectors $w^m$ of the various digital beamformers are in general different due to the application of different adaptive algorithms that result in different multibeam antenna gain pattern. Due to differences in the digital beamformers weight vectors, the noise processes at the digital beamformers' outputs given by $n_o^m(k)=(w^m)^H \bar{n}(k)$, with $\bar{n}(k)$ denoting the complex baseband noise vector $\bar{n}(k)=[n_1(k) \ldots n_N(k)]^T$ wherein $n_i(k)$, $i=1, 2, \ldots, N$ denotes the noise present at the output of the IF to digital baseband converter 65-$i$, may be significantly uncorrelated with each other. Thus an additional diversity gain may be achieved by the application of the maximal ratio combining technique in the weighted combiner given by (35).

In maximal ratio combining technique, the weights $\psi_n^j$ in (35) are selected to be proportional to the signal to noise ratio present at the M inputs to the weighted combiner 100-$n$ after the signal phase of the various inputs are aligned with one of the inputs selected as the reference. Selecting the first input $u_n^1$ as the reference, the phase difference $\phi_n^m$ between the phase of the inputs $u_n^1$ and $u_n^m$ may be estimated as $$\phi_n^m(k)=\arg[\xi_n^m(k)]; \xi_n^m(k)=\lambda \xi_n^m(k-1)+(1-\lambda)u_n^1 u_n^{m*}; k=1,2,\ldots \tag{37}$$

The initial estimate for $\xi_n^m(0)$ in (37) may be taken to be 0. In (37) $\arg(z)$ denotes the phase of z for any complex value z and $\lambda$ with $0<\lambda<1$ is the exponential data weighting coefficient determining the averaging period. In various other embodiments of the invention, other techniques for the phase estimation may be applied for the estimation of $\phi_n^m(k)$ or $\xi_n^m(k)$. The signal to noise ratio $\Gamma_n^m(k)$ at the $m^{th}$ input to the weighted combiner 100-$n$ may be estimated as $$\Gamma_n^m(k) = \frac{P_n^m(k) - (\sigma_n^m)^2}{(\sigma_n^m)^2} \tag{38}$$

In (38) $P_n^m(k)$ is the total power estimate as estimated by (36) and $(\sigma_n^m)^2$ may be estimated by $(\sigma_o^2 B_n/B_R)$ where $\sigma_o^2$ is the variance of the noise present at the outputs 70$n$ of the IF to baseband converter 65$n$, $B_R$ is the bandwidth of the complex baseband signal 70$i$ $x_i(k)$ and $B_n$ is the bandwidth of the user n signal. For the case of equal bandwidth allocated to all the users, $(B_R/B_n)=K$ where K is the number of users. The weighting coefficient $\psi_n^m$ in (35) for the maximal ratio combining is given by $$\psi_n^m(k)=\Gamma_n^m(k)\exp[j\phi_n^m(k)]; j=\sqrt{-1}; n=1,2,\ldots,K; m=1,2,\ldots,M \tag{39}$$

In various embodiments of the invention, a blind mode adaptive algorithm such as the Sato's algorithm may be used to obtain the combiner weights $\psi_n^m$ (k) in (35). Foe faster convergence, the signals 90$n$ $u_n^m(k)$ are first normalized by the square root of the average signal power $P_n^s$ providing $y_n^m(k)$ by $$y_n^m(k)=u_n^m(k)/\sqrt{P_n^{s,m}}; P_n^{s,m}=P_n^m(k)-(\sigma_n^m)^2 \tag{40}$$

and the weighted combiner output given by $$u_n(k) = \sum_{m=1}^{K_n} \Psi_n^m(k) y_n^m(k) \tag{41}$$

The update for $\psi_n^m$ (k) in (41) using the Sato's algorithm is given by $$\psi_n^m(k+1)=\psi_n^m(k)-\mu[u_n(k)-\gamma_n sgn(u_n(k))]^* \tag{42}$$

In (42) $\mu$ is some sufficiently small positive scalar to ensure convergence, * denotes complex conjugate operation, sgn(z) is the signum function operating separately on the both the real and imaginary parts of real argument z. The signum function is equal to the function D(x) defined by (17b) with $V_t=0$. The scalar $\gamma^n$ in (42) for the $n^{th}$ user signal is given by is given by $$\gamma_n = \frac{E[|s_n(k)|^2]}{E[|s_n(k)|]} = \frac{P_n^s}{E[|s_n(k)|]} \tag{43}$$

In (42), (43) $\gamma_n$ is the property of the modulation type used for the $n^{th}$ signal and may be known a-priori, in that case it does not need to be estimated from (43), for example, for BPSK modulation $\gamma_n$ is equal to 1. In case $\gamma_n$ needs to be estimated from (43), $P_n^s$ may be estimated by averaging the powers $P_n^{s,m}$ over the index m, and $E[|s_n (k)|]$ may be estimated by time averaging the absolute value of the signal $|u_n^m(k)|$ averaged over the index m.

In various other embodiments of the invention, the various user signals may transmit in a code division multiple accessing (CDMA) system wherein the sampled complex baseband signal for user n is given by $$u_n^{ss}(k)=d_n^I(k)c_n^I(k)+jd_n^Q(k)c_n^Q(k); d_n(k)=d_n^I(k)+jd_n^Q(k); j=\sqrt{-1} \tag{44}$$

In (44) $d_n^I$ (k) and $d_n^Q$(k) denote the inphase and quadrature data of user n modulating the inphase code $c_n^I$ (k) and quadrature code $c_n^Q$(k) respectively assigned to user n.

Figure 4:
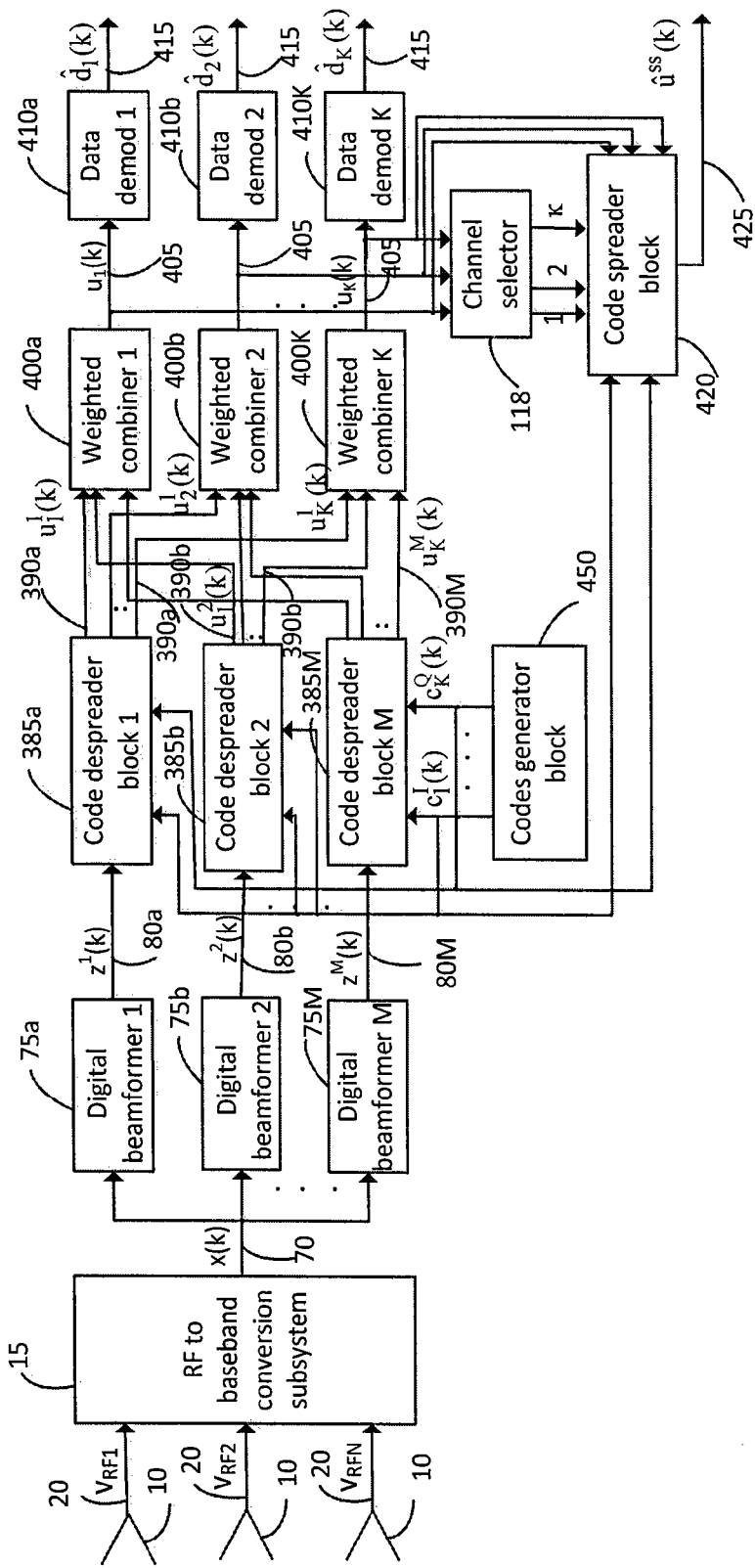
FIG. 4 shows a block diagram of one embodiment of multi-beam antenna system for the case of code division multiple accessing (CDMA) mode.

FIG. 4 shows the block diagram of one embodiment of the invention for the CDMA multiple accessing communication system. Referring to FIG. 4, the outputs of the feeds 10 are inputted to the RF to baseband conversion system 15 of the MBA system 2 with the output of the subsystem represented by the vector $x(k)=[x_1(k) \ldots x_N(k)]^T$ wherein $x_i(k)$ is the sampled complex baseband signal derived from the received RF signal $v_{RF_i}(t)$ for i=1, 2, ..., N. The complex baseband signal vector x(k) is inputted to each of the M digital beamformers 75$a$, ..., 75M. The outputs $z^m(k)$ of the digital beamformer is inputted to the code despreader block 385$m$ for m=1, 2, ..., M. The code despreader block 385$m$ outputs the K despread signals 390$m$ $u_n^1(k), \ldots, u_n^M(k)$ given by $$u_n^m(k)=A_n^m[d_n^I(k)+jd_n^Q(k)]\exp(j\theta_n^m)+n_n^m(k); j=\sqrt{-1}; m=1,2,\ldots,M \tag{45}$$

In (45) $A_n^m$ and $\theta_n^m$ denote the amplitude and phase respectively for the digital beamformer m.

Figure 5:
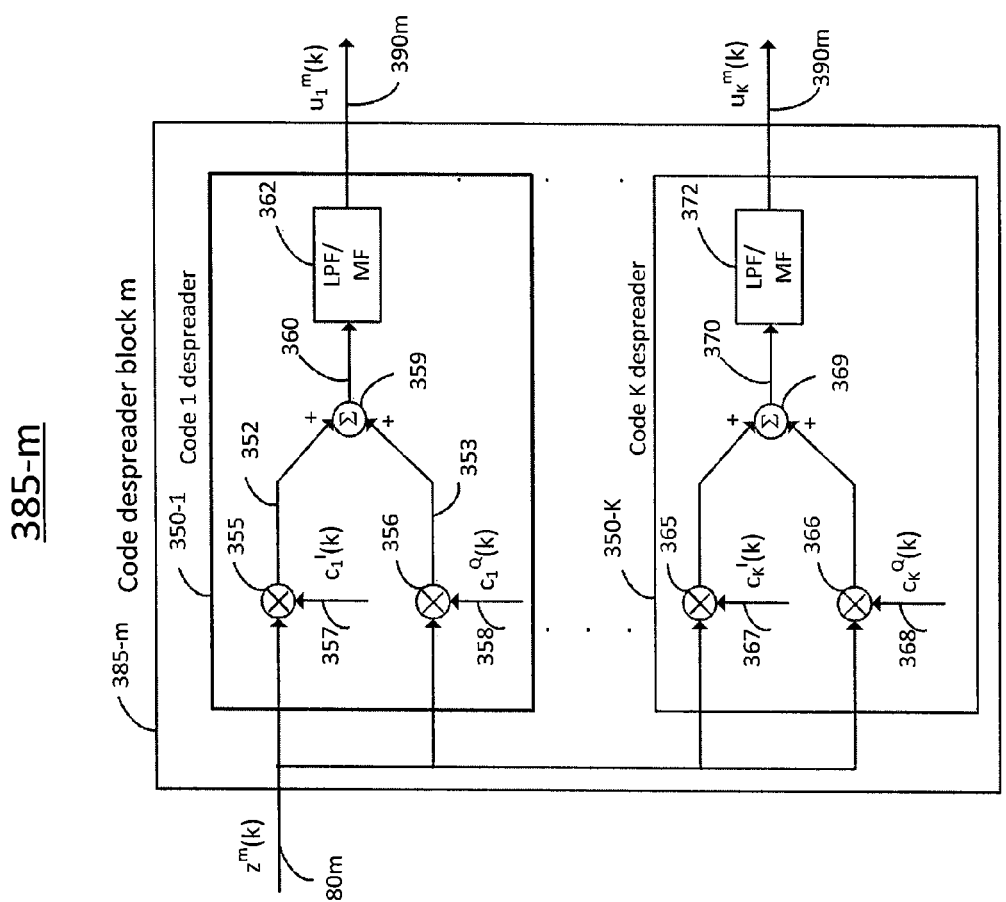
FIG. 5 shows a block diagram of one embodiment of code despreader block.

FIG. 5 shows the block diagram of the code despreader block 385$m$. Referring to FIG. 5, the digital beamformer output 80$m$ $z^m(k)$ is inputted to a bank of K code despreaders 350-1 through 350-K. Referring to FIG. 5, the digital beamformer output $80m$ $z^m(k)$ is inputted to the inphase and quadrature code despreaders 355, 356 of the code despreader 350-1. The other inputs of the inphase and quadrature code despreaders 355, 356 are provided with the inphase code 357 $c_1^I(k)$ and the quadrature code $c_1^Q(k)$ respectively of user 1 made available by the codes generator block 450 of FIG. 4. The outputs 352 and 353 of the inphase and quadrature code despreaders 355, 356 are added by the adder 359. The output 360 of the adder is inputted to the LPF/MF block 362. The LPF/MF block filters the input 360 using either a low pass filter or a matched filter providing the user 1 signal $390m$ $u_1^m(k)$. In a likewise manner code i despreader blocks 350-i provide the user i signals $u_i^m(k)$ for i=2, . . . , K.

Referring to FIG. 4, the signals $u_n^1(k), \ldots, u_n^M(k)$ are inputted to the weighted combiner $400n$ block that combines the signals $u_n^1(k), \ldots, u_n^M(k)$ with weights determined according to (35) to (43) resulting in user n signal $u_n(k)$ at the output of the weighted combiner $400n$ with $u_n(k)$ given by $$u_n(k) = A_n[d_n^I(k) + jd_n^Q(k)]\exp(j\theta_n) + n_n(k); j = \sqrt{-1} \quad (46)$$

In (46) $A_n$ and $\theta_n$ denote the amplitude and phase associated with the user signal n with $n_n(k)$ denoting the noise at the weighted combiner output.

Referring to FIG. 4, the signal $u_n(k)$ is inputted to the data demodulator $410n$ that provides the demodulated data output $\hat{d}_n(k) = \hat{d}_n^I(k) + j\hat{d}_n^Q(k); j = \sqrt{-1}$ where $\hat{d}_n(k)$ denotes the estimate of the data symbol $d_n(k)$ of user n. Referring to FIG. 4, the code spreader block 420 may generate the signal $$\hat{u}^{ss}(k) = \sum_{n=1}^{K} \hat{u}_n^{ss}(k)$$

with $\kappa$ denoting the number of signals and $\hat{u}_n^{ss}(k)$ denoting the estimate of the user signal n given by (44) with $d_n^I(k)$ and $d_n^Q(k)$ replaced by their estimates $\hat{d}_n^I(k)$ and $\hat{d}_n^Q(k)$ respectively.

Figure 6:
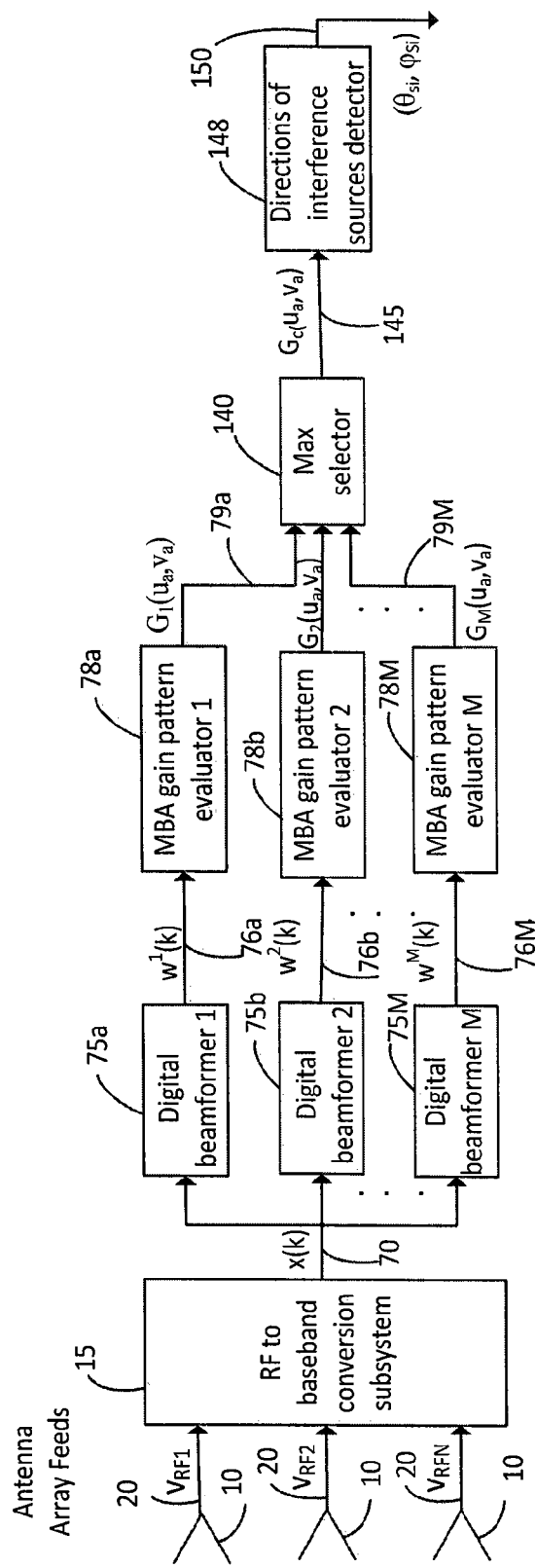
FIG. 6 shows a block diagram of one embodiment of multi-beam antenna system for locating the direction of the interference or jammer sources.

FIG. 6 shows the block diagram of one embodiment of the invention for finding the direction of interference or jamming sources. Referring to FIG. 6, the outputs of the feeds 10 are inputted to the RF to baseband conversion system 15 of the MBA system 3 with the output of the subsystem $x_1(k) \ldots x_N(k)$ wherein $x_i(k)$ is the sampled complex baseband signal derived from the received RF signal $v_{RF_i}(t)$ for i=1, 2, . . . , N. The complex baseband signals $x_1(k) \ldots x_N(k)$ are inputted to each of the M digital beamformers 75a, . . . , 75M. The digital beamformers shape the multibeam antenna gain pattern by introducing nulls in the directions of the interference sources using the various algorithms such as QS, QC2, and SMI etc. with possibly different algorithm parameters.

Referring to FIG. 6, the digital beamformers 75a through M output the beamformer weight vectors 76 $w^1(k)$, $w^2(k), \ldots, w^M(k)$ achieved after the adaptation phase of the adaptive algorithms. The beamformer weight vectors 76 $w^1(k), w^2(k), \ldots, w^M(k)$ are inputted to the MBA gain pattern evaluators 78a through 78M that evaluate the MBA gain patterns $G_1(u_a, v_a), G_2(u_a, v_a), \ldots, G_M(u_a, v_a)$, in the coverage area as a function of the parameters $u_a, v_a$ given by $$u_a = (\pi D_a/\lambda_a)\sin(\theta_a)\cos(\phi_a); v_a = (\pi D_a/\lambda_a)\sin(\theta_a)\sin(\phi_a) \quad (47)$$

wherein $\theta_a$ and $\phi_a$ are respectively the elevation and azimuth angles in the satellite coordinate system, $\lambda_a$ is the signal wavelength and $D_a$ is the reflector diameter. The MBA gain pattern $G_m(u_a, v_a)$, m=1, 2, . . . , M may be obtained, for example, based on the model in the teachings of J. T. Mayhan in "Nulling limitations for a multiple-beam antenna," IEEE Transactions on Antennas and Propagation, Vol. AP-24, No. 6, March 1976, pp. 769-779 incorporated by reference with this application.

Referring to FIG. 6, the multiplicity M MBA gain patterns $G_m(u_a, v_a)$, m=1, 2, . . . , M are inputted to the max selector block 140 that selects the maximum of $G_1(u_a, v_a), G_2(u_a, v_a), \ldots, G_M(u_a, v_a)$ for various values in the coverage area. The $(u_a, v_a)$ values for which the various gains are evaluated may lie on a rectangular grid in the $u_a, v_a$ parameter space with an appropriate grid spacing. Initially a relatively course grid may be selected for the evaluation of the MBA gain patterns and the evaluations may be repeated on relatively fine grids around the jammer locations for a more precise evaluation of the $u_a, v_a$ coordinates of the jammers.

Referring to FIG. 6, the gain pattern 145 $G_c(u_a, v_a)$ at the output of the max selector block 140 is inputted to the direction of the interference sources detector that obtains various local minima in the gain pattern using any of the known function minimization algorithms. Such algorithms include the LMS and Newton's algorithms for the function minimization. The $u_a, v_a$ coordinates of the various jammers may be denoted by $u_{a,J_i}, v_{a,J_i}$ for i=1, 2, . . . , $N_I$ with $N_I$ denoting the number of jammers or interference sources. As $0 \le \theta_{J_i} \le \pi/2$, with the use of equation (47), the value of $\sin(\theta_{J_i})$ may be obtained by (48)

$$\sin(\theta_{J_i}) = \frac{\lambda_a}{\pi D_a}\sqrt{\{u_{J_i}^2 + v_{J_i}^2\}} \quad (48)$$

From (48) the elevation angle $\theta_{J_i}$ may be evaluated as $$\theta_{J_i} = \sin^{-1}\left[\frac{\lambda_a}{\pi D_a}\{u_{J_i}^2 + v_{J_i}^2\}^{1/2}\right]; \quad (49)$$

$$i = 1, 2, \ldots, N_I$$

From (47) and (48), the values of $\cos(\phi_{J_i})$ and $\sin(\phi_{J_i})$ may be obtained in (50)

$$\cos(\phi_{J_i}) = (\lambda_a/\pi D_a)u_{J_i}/\sin(\theta_{J_i}); \sin(\phi_{J_i}) = (\lambda_a/\pi D_a)v_{J_i}/\sin(\theta_{J_i}); \theta_{J_i} \ne 0 \quad (50)$$

With the knowledge of $\cos(\phi_{J_i})$ and $\sin(\phi_{J_i})$ in (50), $\phi_{J_i}$ may be obtained from the four quadrant inverse tangent function.

In case wherein the signal sources are transmitting along with the interference or jammer sources, the minima obtained by the source detector 148 will comprise of the $(u_a, v_a)$ or the $(\theta_a, \phi_a)$ coordinates of both the desired signal sources and the interference sources. In such a case, the signal sources may be identified by a separate means such as via signaling information between the satellite, or the base station in case of the applications of the MBA architectures to the terrestrial systems, and the signal sources, or from their locations obtained possibly by GPS or other position location means, thereby identifying the directions of the interference or jammer sources from all the $(\theta_a, \phi_a)$ coordinates provided by the source detector 148.

Figure 7:
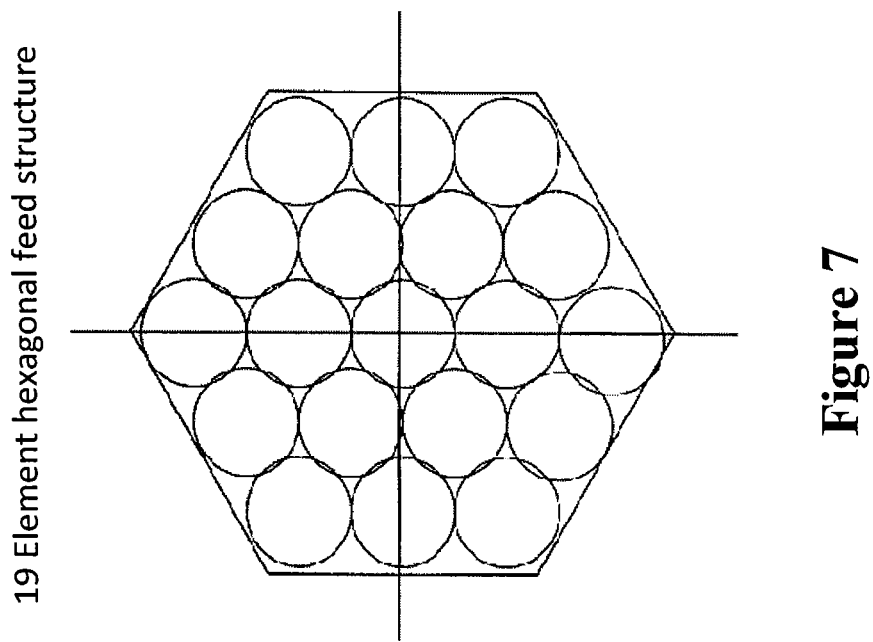
FIG. 7 shows diagram of a 19 element hexagonal feed structure.

A simulation example with 19 elements hexagonal structure as shown in FIG. 7 is considered located in the focal plane of a parabolic reflector, not shown. The evaluation of the complex electric field pattern for various feeds is based on the Mayhan model. The MBA gain pattern is evaluated using the weighted sum of the complex electric field due to various feeds with the weights given by the components of any of the beamformer weight vectors 76 $w^1(k)$, $w^2(k), \ldots, w^M(k)$. The offset reflector geometry is considered with the "f" number defined as the focal length $f_a$ to the reflector diameter $D_a$ ratio ($f_a/D_a$) set equal to 0.25.

In the simulation example, the MBA normalized gain pattern with the maximum gain normalized to 0 dB is plotted versus the parameters $u_a = (\pi D_a/\lambda_a) \sin(\theta_a) \cos(\phi_a)$ and $v_a = (\pi D_a/\lambda_a) \sin(\theta_a) \sin(\phi_a)$ where $\theta_a$ and $\phi_a$ are respectively the elevation and azimuth angles in the satellite coordinate system. In the simulation example, two jammers with relative power levels of 40 dB and 30 dB relative to the spatially uncorrelated white noise of variance $\sigma_n^2$ are present with their ($u_a$, $v_a$) coordinates given by (3.3, 1.9) and (−1.8, −1.8) respectively corresponding to the elevation and azimuth angles ($\theta_a$, $\phi_a$) equal to (0.98°, 28°) and (0.66°, 225°) respectively.

Figure 8:
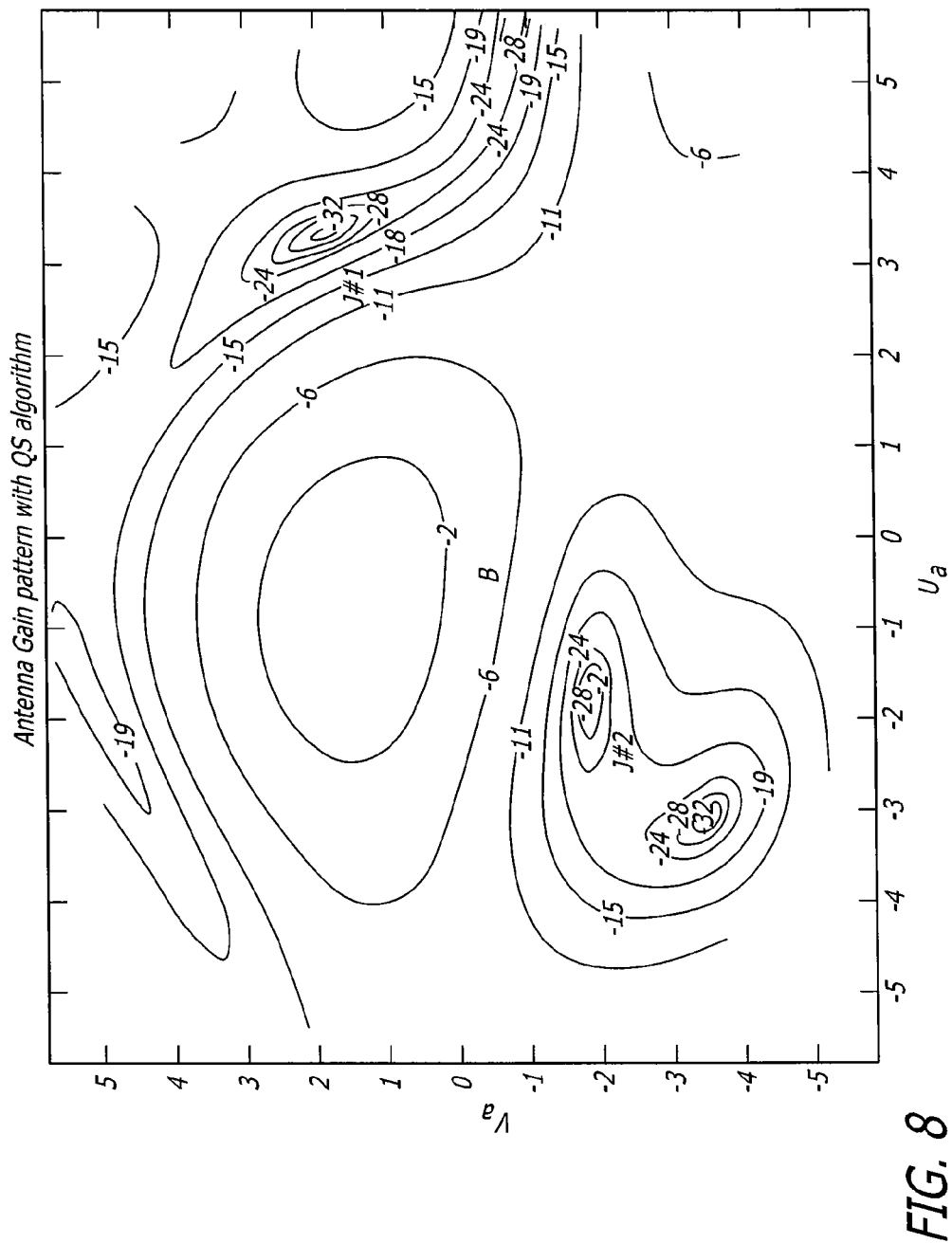
FIG. 8 shows contour plot of antenna gain pattern with QS algorithm.
Figure 9:
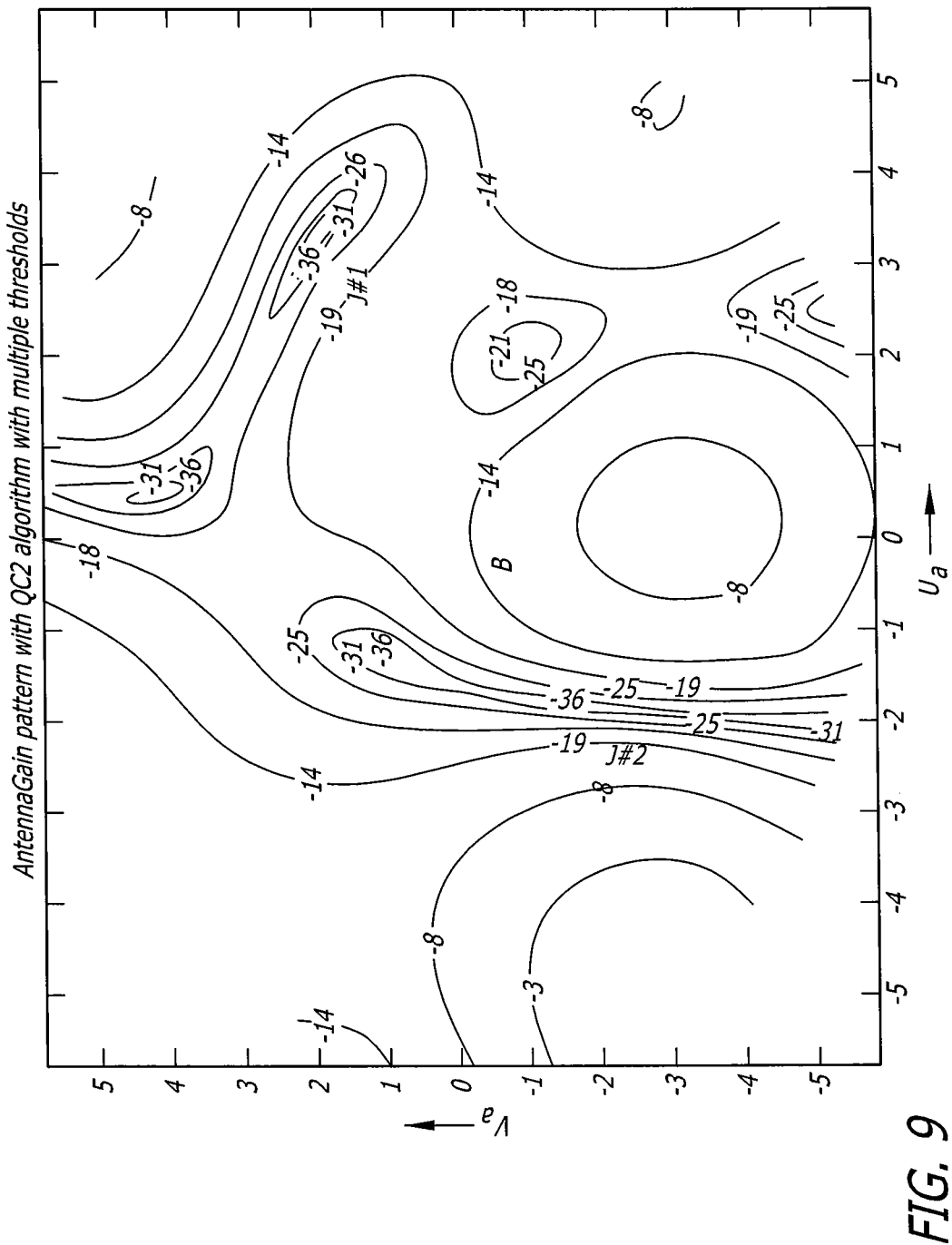
FIG. 9 shows contour plot of antenna gain pattern with QC2 algorithm with multiple thresholds.
Figure 10:
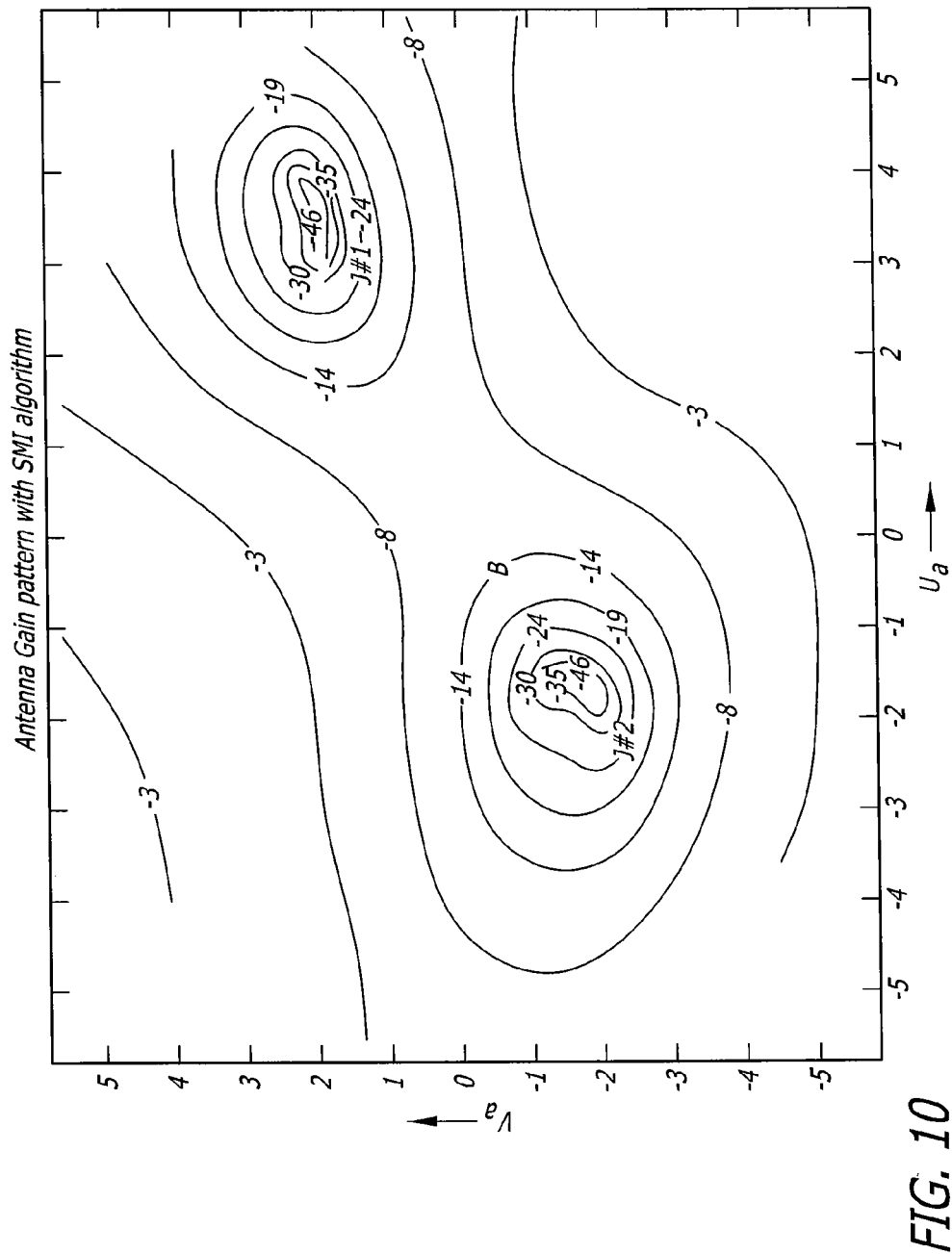
FIG. 10 shows contour plot of antenna gain pattern with SMI algorithm.
Figure 11:
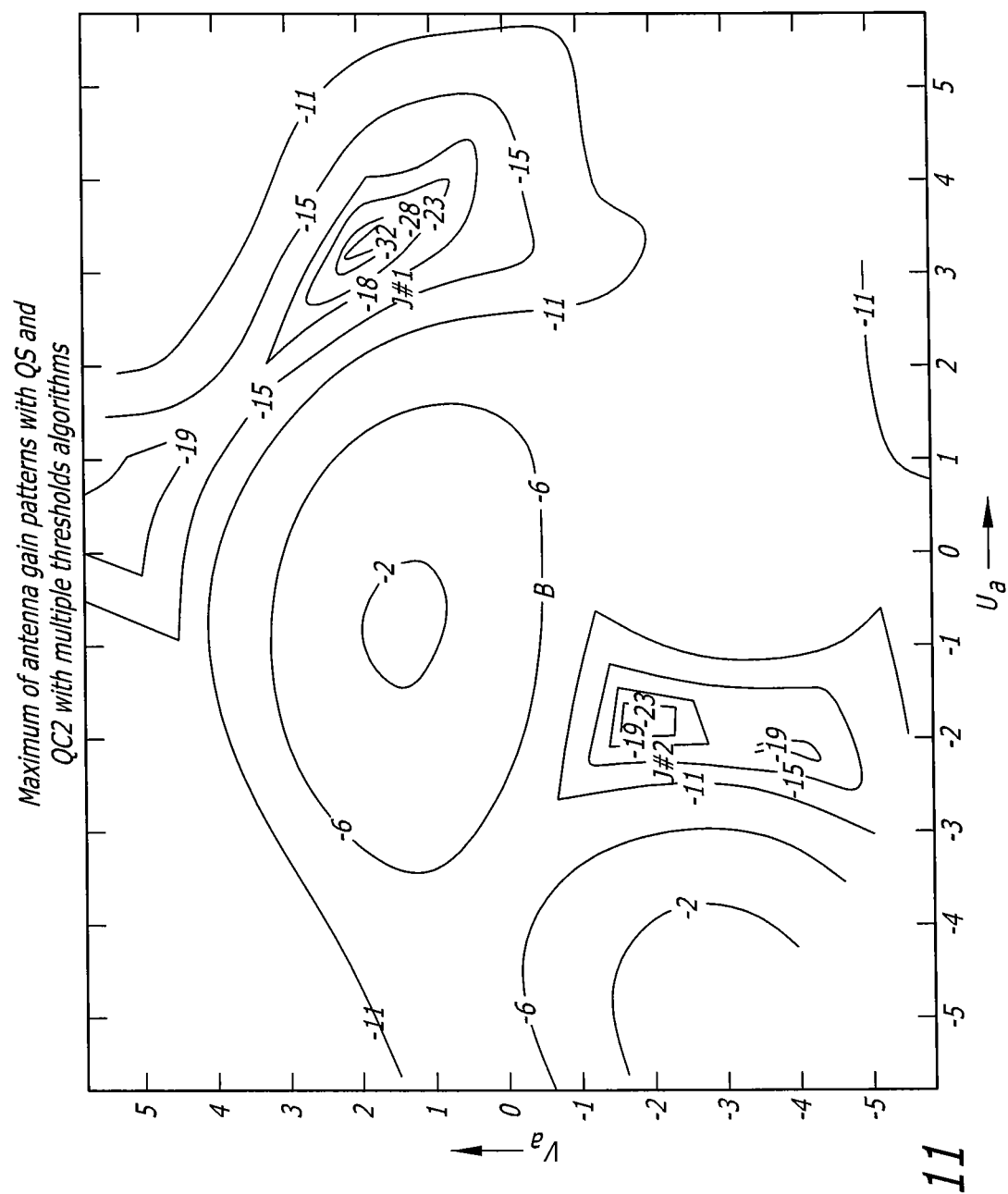
FIG. 11 shows contour plot of the maximum of antenna gain patterns with QS algorithm and QC2 algorithm with multiple thresholds.

FIG. 8 shows the contour plot of the multibeam antenna gain pattern after the adaptation using the QS algorithm with FIG. 9 showing the corresponding result for the QC2 algorithm with two thresholds in (20) selected as $V_{t1}=3$, $V_{t2}=100$, $V_1=1$ and $V_2=8$. FIG. 10 shows the antenna gain pattern contour plot for the SMI algorithm. As may be inferred from FIGS. 8 to 10, different adaptive algorithms result in significantly different gain pattern and exhibit certain spurious nulls in addition to the nulls in the locations of the jammers. Compared to the SMI algorithm, the QC2 algorithm provides a better gain in the vicinity of the jammers with relatively smaller gain in the region away from the jammers. The SMI algorithm exhibits an offset of the null from the jammer location. The QS algorithm provides an overall better gain in the coverage area compared to both the SMI and QC2 algorithms. FIG. 11 plots the antenna gain contour obtained by selecting the maximum of the gain obtained from the QC2 and QS algorithms.

As may be inferred form FIG. 11, the contour plot does not show the spurious minima that appear in FIGS. 8 and 9 except for two shallow ones near the boundary of the coverage area. By taking the maximum of the QS, QC2, and SMI gain patterns, not shown, these spurious nulls are also eliminated. In different jammer scenarios, different spurious nulls are exhibited by the SMI, QS and QC2 algorithms. FIG. 11 also shows that that location of the nulls are much closer to the jammer locations compared to that in any of the three gain plots obtained by any single algorithm selected from the QS, QC2, and SMI algorithms shown in FIGS. 8 to 10.

Figure 12:
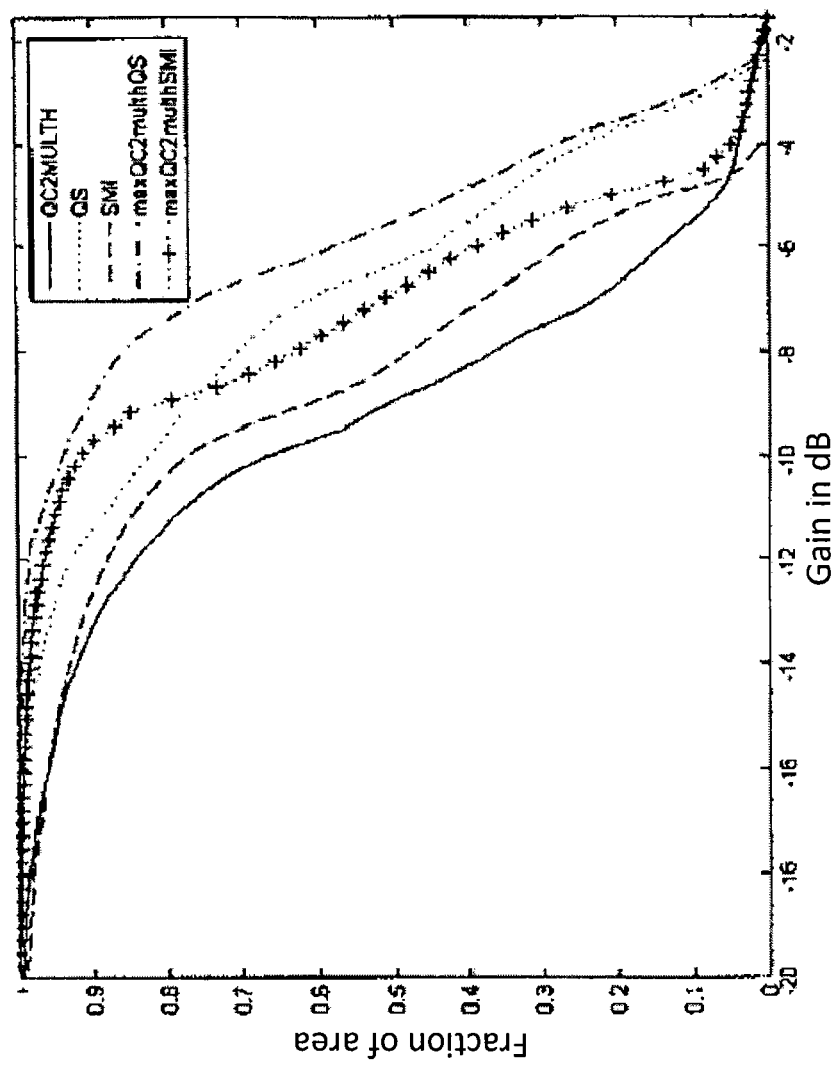
FIG. 12 shows comparison of the antenna gain distributions obtained with different algorithms.

FIG. 12 shows the plot of the gain distribution achieved by different adaptive algorithms wherein the fraction of the coverage area where the normalized gain exceeds any specified value is plotted. In FIG. 12, the label "QC2MULTH" refers to the QC2 algorithm with multiple thresholds or the GQC2 algorithm. It may be inferred from FIG. 12 that when a single algorithm is used, the QS algorithm is superior to both the SMI and QC2 algorithms. However, as the comparison of FIGS. 8-10 shows different algorithms provide a better gain coverage in different regions of the coverage area resulting in a significant increase in the gain obtained by the use of multiple beamformers of the invention. Referring to FIG. 12, the SMI algorithm exceeds the normalized gain of −6 dB in about 28% of the coverage area, compared to 57% of the area for the QC2-QS algorithm. By using more than two beamformers, the gain coverage may be increased even further.

Figure 13:
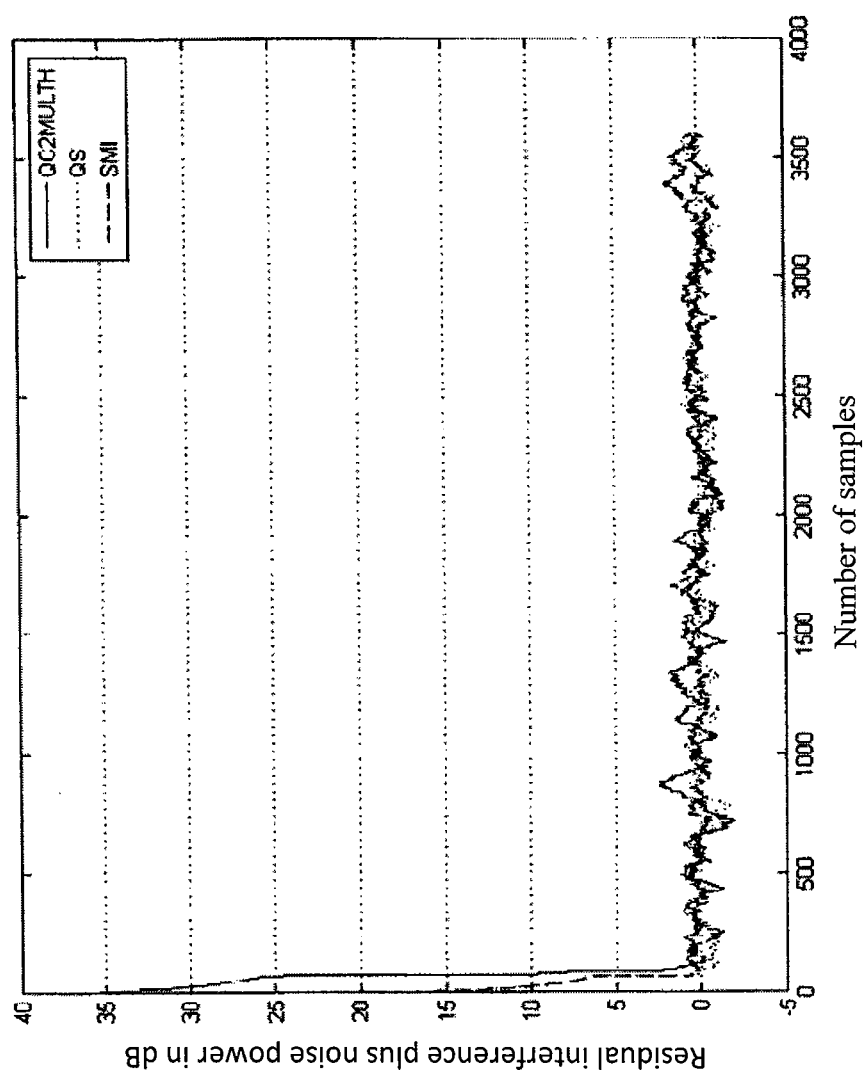
FIG. 13 shows the convergence of residual interference plus noise power for various algorithms.

FIG. 13 plots the residual interference plus noise power at the beamformer output for the three algorithms. As may be inferred from the FIG. 13, while there are differences in the initial convergence rates of the QC2 and QS or SMI algorithm, all three algorithms after the initial convergence have about the same residual interference plus noise power with only a relatively small increase of about 1 dB in residual power due to the jammer over the 0 dB level due to the spatial noise, and with small fluctuations resulting from a relatively small averaging period in determining the residual power.

Figure 14:
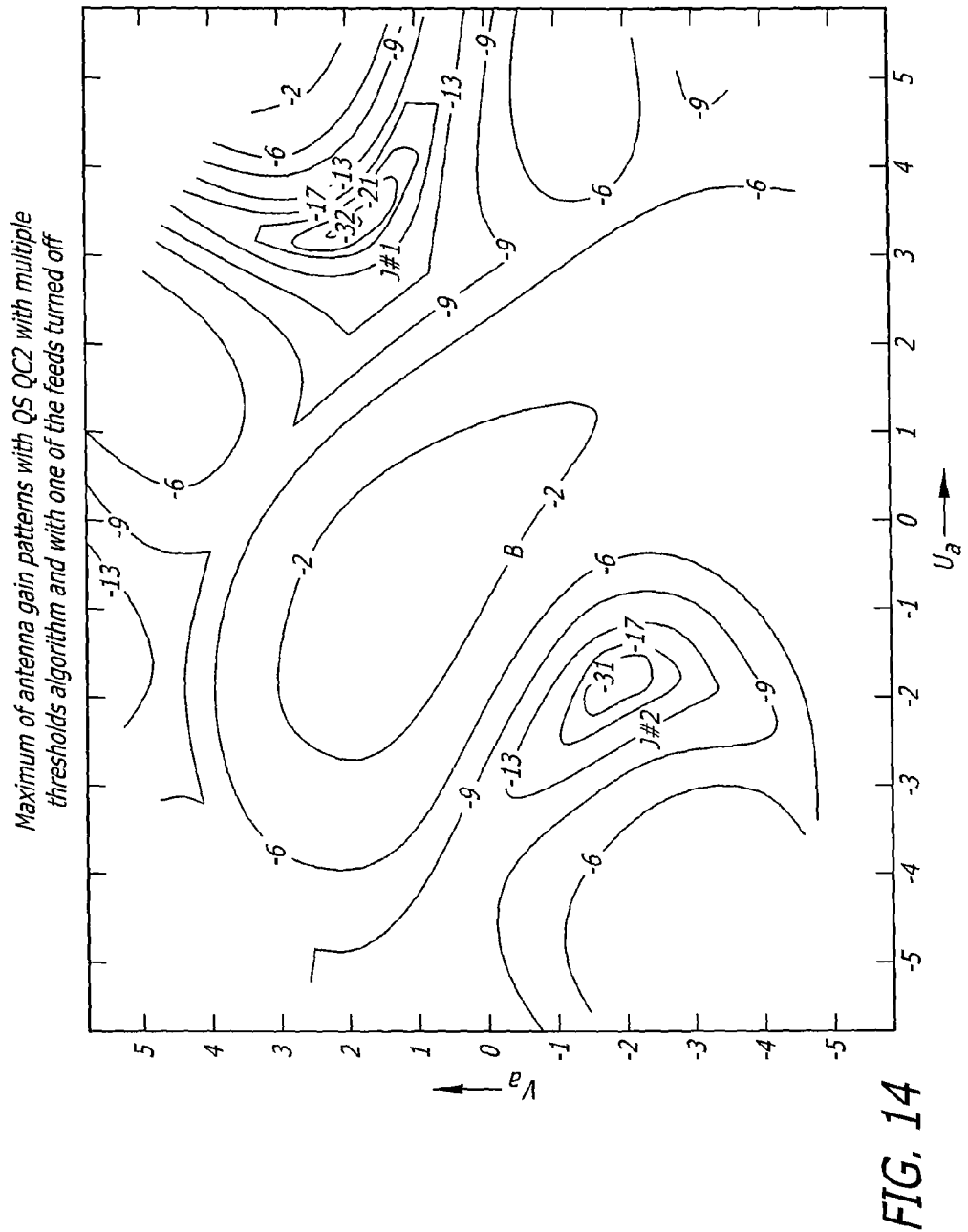
FIG. 14 shows contour plot of the maximum of antenna gain patterns with QS algorithm and QC2 algorithm with multiple thresholds with one of the feeds' outputs turned off.
Figure 15:
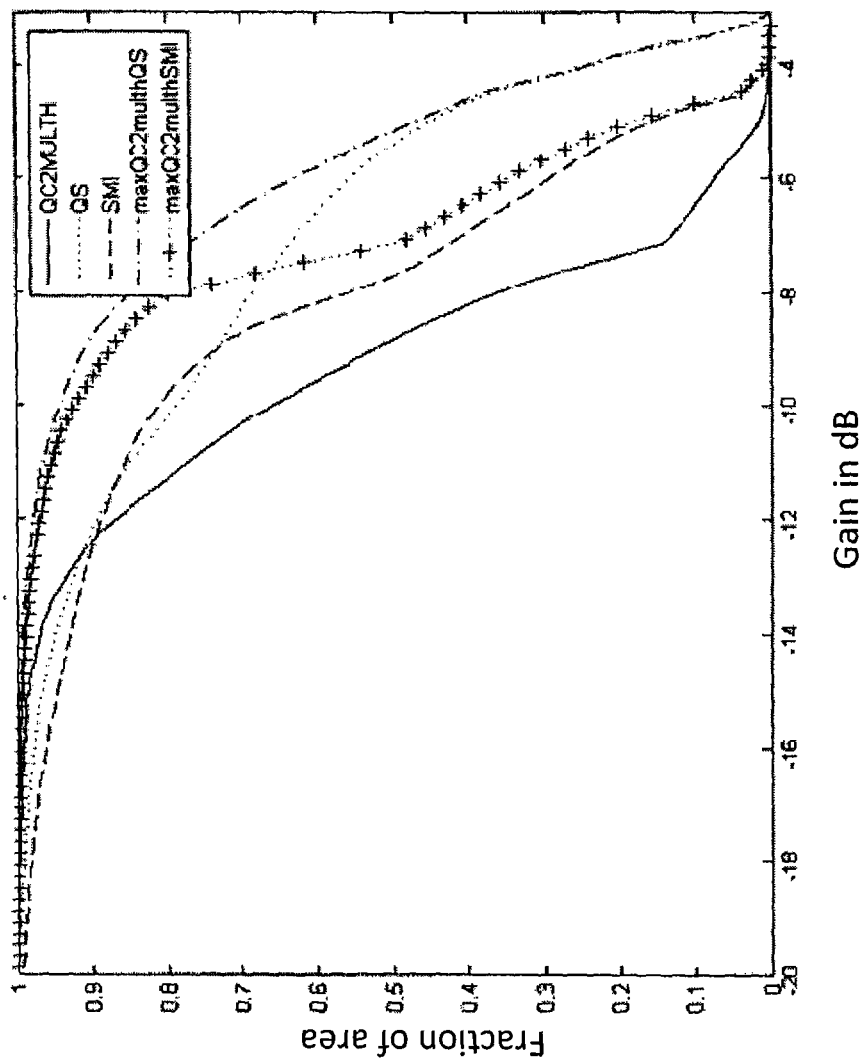
FIG. 15 shows comparison of the antenna gain distributions obtained with different algorithms with one of the feeds' outputs turned off.

FIG. 14 shows the gain contour plot for the combined QC2-QS algorithm when one of the feed output with maximum power is turned off achieved by disconnecting the corresponding output 70$n$ of the IF to baseband converter 65$n$ from the digital beamformers 75 and in its place inputting 0s to the corresponding inputs of the digital beamformers 75. As may be inferred from the FIG. 14, there are no spurious minima in the coverage area with more localized minima at the jammer locations. This is also reflected in terms of a better gain distribution in the coverage area plotted in FIG. 15. FIG. 15 shows that 64% of the coverage area exceeds −6 dB gain for the QC2-QS algorithm compared to 57% in FIG. 15 wherein none of the feed outputs is switched off and compared to the 28% value obtained with the SMI algorithm by itself.

Various modifications and other embodiments of the invention applicable to various problems in Engineering and other fields will be readily apparent to those skilled in the art in the field of invention. For example, various multibeam architectures can be applied to the terrestrial wireless systems. The interference source location architectures may be applied to RF security monitoring of buildings and installations. The multibeam architectures of the invention can be readily modified and applied to various fields where such an architecture is applicable. Examples of such fields include Radars, sonar, digital audio systems and so on.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein, including, for example, most of the modules of FIG. 1 may be implemented in many different embodiments of software, firmware, and/or hardware, for example, based on Field Programmable Gate Array (FPGA) chips or implemented in Application Specific Integrated Circuits (ASICS). The software and firmware code may be executed by a computer or computing device comprising a processor (e.g., a DSP or any other similar processing circuit) including, for example, the computing device 1600 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 16:
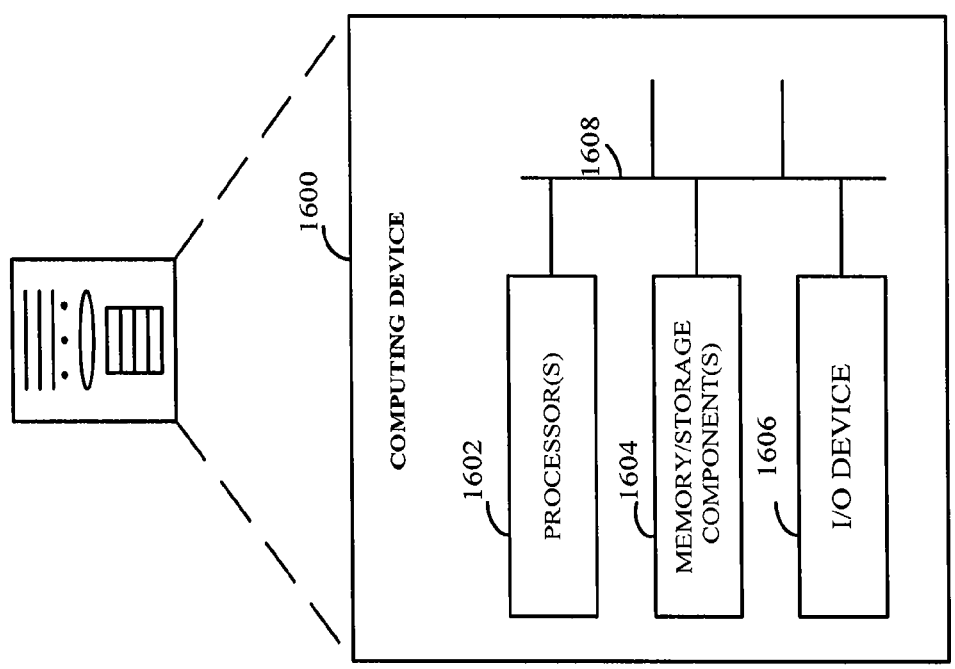
FIG. 16 shows one embodiment of an example computer device.

FIG. 16 shows an example of a computing device 1600 according to one embodiment. For the sake of clarity, the computing device 1600 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 16, the computing device 1600 comprises one or more processor circuits or processing units 1602, one or more memory circuits and/or storage circuit component(s) 1604 and one or more input/output (I/O) circuit devices 1606. Additionally, the computing device 1600 comprises a bus 1608 that allows the various circuit components and devices to communicate with one another. The bus 1608 represents one or more of any of several types of bus structures, including a memory bus or memory controller, a peripheral bus, an accelerated graphics port, and a processor or local bus using any of a variety of bus architectures. The bus 1608 may comprise wired and/or wireless buses.

The processing unit 1602 may be responsible for executing various software programs such as system programs, applications programs, and/or program modules/blocks to provide computing and processing operations for the computing device 1600. The processing unit 1602 may be responsible for performing various voice and data communications operations for the computing device 1600 such as transmitting and receiving voice and data information over one or more wired or wireless communications channels. Although the processing unit 1602 of the computing device 1600 is shown in the context of a single processor architecture, it may be appreciated that the computing device 1600 may use any suitable processor architecture and/or any suitable number of processors in accordance with the described embodiments. In one embodiment, the processing unit 1602 may be implemented using a single integrated processor.

The processing unit 1602 may be implemented as a host central processing unit (CPU) using any suitable processor circuit or logic device (circuit), such as a as a general purpose processor. The processing unit 1602 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1602 may be coupled to the memory and/or storage component(s) 1604 through the bus 1608. The bus 1608 may comprise any suitable interface and/or bus architecture for allowing the processing unit 1602 to access the memory and/or storage component(s) 1604. Although the memory and/or storage component(s) 1604 may be shown as being separate from the processing unit 1602 for purposes of illustration, it is worthy to note that in various embodiments some portion or the entire memory and/or storage component(s) 1604 may be included on the same integrated circuit as the processing unit 1602. Alternatively, some portion or the entire memory and/or storage component(s) 1604 may be disposed on an integrated circuit or other medium (e.g., hard disk drive) external to the integrated circuit of the processing unit 1602. In various embodiments, the computing device 1600 may comprise an expansion slot to support a multimedia and/or memory card, for example.

The memory and/or storage component(s) 1604 represent one or more computer-readable media. The memory and/or storage component(s) 1604 may be implemented using any computer-readable media capable of storing data such as volatile or non-volatile memory, removable or non-removable memory, erasable or non-erasable memory, writeable or re-writeable memory, and so forth. The memory and/or storage component(s) 1604 may comprise volatile media (e.g., random access memory (RAM)) and/or nonvolatile media (e.g., read only memory (ROM), Flash memory, optical disks, magnetic disks and the like). The memory and/or storage component(s) 1604 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1606 allow a user to enter commands and information to the computing device 1600, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADC's, DAC's, a display device (e.g., a monitor or projector, speakers, a printer, a network card). The computing device 1600 may comprise an alphanumeric keypad coupled to the processing unit 1602. The keypad may comprise, for example, a QWERTY key layout and an integrated number dial pad. The computing device 1600 may comprise a display coupled to the processing unit 1602. The display may comprise any suitable visual interface for displaying content to a user of the computing device 1600. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 1602 may be arranged to provide processing or computing resources to the computing device 1600. For example, the processing unit 1602 may be responsible for executing various software programs including system programs such as operating system (OS) and application programs. System programs generally may assist in the running of the computing device 1600 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 1600 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, the distribution of software may be an Internet download.

I claim:

1. A receiver system for receiving user signals from a plurality K of signal sources distributed in an area of coverage transmitting signals in a multiple access mode in a presence of a plurality $N_J$ of jammers comprised of jammers in the area of coverage wherein $N_J$ is an integer greater than or equal to 1, the system comprised of:
    an array of multiplicity N antenna feeds for receiving radio frequency (RF) signals from the plurality K of user signal transmission sources;
    an RF to baseband conversion subsystem inputted with the RF signals from the array of antenna feeds for RF to baseband conversion of the RF signals for providing a multiplicity N of complex baseband signals;
    a multiplicity M of digital beamformers, wherein M is an integer greater than 1, inputted with the multiplicity N complex baseband signals, each of the plurality of digital beamformers providing a respective one of a multiplicity M beamformer outputs with the digital beamformer m for m equal to 1 through M comprised of a corresponding distinct adaptive algorithm selected from a group comprised of a multiplicity $N_a$ of adaptive algorithms with $N_a$ greater than or equal to M providing a multiplicity M of distinct antenna beams for receiving the user signals from the plurality K of signal sources distributed in the area of coverage and introducing nulls in directions of the plurality $N_J$ of jammers comprised of jammers in the area of coverage;
    a channelizer subsystem comprised of a multiplicity M channelizers wherein a channelizer m for m equal to 1 through M is inputted with the output of the respective digital beamformer m of the multiplicity M digital beamformers for providing a multiplicity K of distinct constituent user complex baseband signals comprised of a constituent user k complex baseband signal for k equal to 1 through K by a separation operation performed on the output of the digital beamformer m of the multiplicity M of digital beamformers;
    a multiplicity K of weighted combiners wherein a weighted combiner k for k equal to 1 through K of the multiplicity K of weighted combiners combines the weighted respective multiplicity M constituent user k complex baseband signals outputted from the multiplicity M of channelizers for providing a corresponding reduced interference user complex baseband signals k for k equal to 1 through K of the multiplicity K of reduced interference mitigated user complex baseband signals.

2. The system of claim 1 wherein the receiver system is a satellite based system with the array of antenna feeds in the focal plane of a reflector antenna illuminating the array of antenna feeds.

3. The system of claim 1, wherein the multiple accessing mode is a frequency division multiple accessing (FDMA) mode with the multiplicity K of constituent users complex baseband signals at the channelizer output occupying the respective ones of a multiplicity K disjoint spectral bands with a respective bandwidths $B_k$ for k equal to 1 through K.

4. The system of claim 3, wherein at least one of the channelizers in the channelizer subsystem is comprised of:
    a polyphase analyzer for providing a multiplicity $K_c$ of FFT channels wherein $K_c$ is an integer greater than or equal to K; and
    a multiplicity $K_u$ of polyphase synthesizers for providing the multiplicity K constituent users complex baseband signals from the multiplicity $K_c$ of FFT channels wherein $K_u$ is the number of constituent user complex baseband signals with more than one FFT channels.

5. The system of claim 3, wherein at least one of the channelizers in the channelizer subsystem is comprised of a bank of filters based on at least one of the methods selected from a group comprised of analytical signal method, frequency domain filtering method, multistage method, and the hybrid method.

6. The system of claim 1, wherein the multiple accessing mode is in a code division multiple accessing (CDMA) mode wherein the complex output of a digital beamformer m of the multiplicity M of digital beamformers inputted to the corresponding channelizer m for m equal to 1 through M, is comprised of a multiplicity K of constituent signals with a constituent signal k for k equal to 1 through K equal to a user k spread spectrum signal comprised of a real part equal to a user k inphase data spread by a user k inphase spreading code, modified by a k and m dependent complex gain.

7. The system of claim 6, wherein a channelizer m inputted with the complex output of the digital beamformer m for m equal to 1 through M is comprised of a bank of multiplicity K code despreader blocks wherein the code despreader block k for k equal to 1 through K is comprised of a first despreader inputted with the output of the digital beamformer m and provided with user k inphase despreading code; and a first low pass filter, for providing the constituent user k complex baseband signal.

8. The system of claim 1, wherein a digital beamformer m for m equal to 1 through M of the multiplicity the M of digital beamformers is comprised of:
   a multiplicity N of multipliers inputted with the respective ones of the multiplicity N complex baseband signals from the RF to baseband conversion subsystem for multiplying the multiplicity N complex baseband signals with the respective components of a beam weight vector;
   an adder for summing the outputs of the multiplicity N multipliers for providing the output of the digital beamformer m; and a distinct adaptive algorithm m from the multiplicity $N_a$ of distinct adaptive algorithms inputted with the multiplicity N complex baseband signals from the RF to baseband conversion subsystem and the output of the digital beamformer m for adaptation of the beam weight vector to introduce nulls in the directions of the multiplicity $N_J$ jammers comprised of jammers in the area of coverage and receiving signals from the plurality K of signal sources in the area of coverage.

9. The system of claim 8, wherein at least one of the multiplicity M of distinct adaptive algorithms for adaptation of the corresponding ones of the multiplicity M of digital beamformers is selected from a group of algorithms comprised of sample matrix inversion (SMI), recursive least squares (RLS), correlation feedback (CF), quantized state algorithms including quantized state 1 (QS1), quantized state 2 (QS2), quantized state 1 with constraints (QC1), quantized state 2 with constraints (QC2) algorithms, and a multiplicity of generalized quantized state algorithms with multiple thresholds wherein a generalized quantized state algorithm is comprised of a set consisting of a number of thresholds $N_t$, a threshold function with a multiplicity $N_t$ of threshold levels based on the power levels of and operating on components of a state vector, and a multiplicity $N_t$ plus 1 of output levels of the threshold function, corresponding to the respective ones of the multiplicity of generalized quantized state algorithms with the components of the state vector comprised of the multiplicity N of complex baseband signals at the output of the RF to baseband conversion subsystem.

10. The system of claim 8, wherein at least one of the multiplicity M of distinct adaptive algorithms for adaptation of the corresponding ones of the multiplicity M of digital beamformers is selected from a group of algorithms comprised of transformed state quantized state algorithms including transformed state quantized state 1 (TQS1), transformed state quantized state 2 (TQS2), transformed state quantized state 1 with constraints (TQC1), transformed state quantized state 2 with constraints (TQC2) algorithm, and a multiplicity of transformed state quantized state algorithms with multiple thresholds wherein a transformed state quantized state algorithm with multiple thresholds is comprised of a set consisting of a number of thresholds $N_t$, a threshold function with a multiplicity $N_t$ of threshold levels based on the power levels of and operating on components of a transformed state vector equal to a state vector multiplied by an eigenvector matrix of covariance matrix of a state vector, and a multiplicity $N_t$ plus 1 of output levels of the threshold function with components of the state vector comprised of the multiplicity N of complex baseband signals at the output of the RF to baseband conversion subsystem.

11. The system of claim 8, wherein at least one of a multiplicity $N_a$ of distinct adaptive algorithms is comprised of:
   computation of a matrix $Q_S$ comprised of columns spanning a linear subspace $S_1$ of an N dimensional space spanned by a multiplicity $N_S$ of steering vectors of the a multiplicity $N_S$ of user signal sources with relatively large signal power levels;
   computation of a matrix $Q_I$ with columns spanning a linear subspace $S_2$ spanned by a multiplicity $N_J$ steering vectors of a multiplicity $N_J$ of interference sources;
   computation of a matrix Q in terms of matrices $Q_S$ and $Q_I$ with columns spanning a subspace S that is equal to the intersection of the subspaces $S_1$ and $S_2$;
   computation of a projection matrix $P_c$ in terms of the matrix Q that maps any vector of dimension N into a subspace that is orthogonal to the subspace S; and
   an algorithm selected from a group of quantized state algorithms with constraints based on the matrix projection matrix $P_c$, the group comprised of quantized state 1 with constraints (QC1), quantized state 2 with constraints (QC2), transformed state quantized state 1 with constraints (TQC1), transformed state quantized state 2 with constraints (TQC2) algorithms with a multiplicity of threshold levels, with the threshold levels selected such that the adaptation algorithm does not introduce nulls in the direction of user signal sources with relatively low signal power levels.

12. The system of claim 8, wherein a digital beamformer m of the multiplicity M of digital beamformers is for receiving signals from a distinct subset $U_m$ of multiplicity $N_S$ user signal sources with $N_S$ less than K while minimizing the interference power with a distinct adaptive algorithm selected from a group comprised of sample matrix inversion (SMI), recursive least squares (RLS), correlation feedback (CF), quantized state algorithms including quantized state 1 (QS1), quantized state 2 (QS2), transformed state quantized state 1 (TQS1), and transformed state quantized state 2 (TQS2) algorithms with a multiplicity of threshold levels with threshold levels selected to shield signal sources of relatively low power from the adaptive algorithms wherein a user signal source in the set union of the multiplicity M of distinct subsets $U_m$ is included in more than 1 subset $U_m$ of the multiplicity M of distinct subsets $U_m$.

13. The system of claim 1, wherein the receiver system is based in a terrestrial wireless network.

14. The system of claim 1, wherein a weighted combiner k for k equal to 1 through K of the multiplicity K of weighted combiners assigns a weight equal to 1 to a constituent user complex baseband signal $m_0$, with $m_0$ dependent upon k, from among a subset of the multiplicity M constituent user complex baseband signals at the input to the weighted combiner outputted from the multiplicity M of channelizers with a maximum signal-to-residual interference plus noise power ratio with the weights assigned to the multiplicity M constituent user complex baseband signals excluding the constituent user complex baseband signal $m_0$ equal to 0.

15. The system of claim 1, wherein a weighted combiner k for k equal to 1 through K selecting a multiplicity $M_u$ less than or equal to M from a respective multiplicity M of constituent user k complex baseband signals inputted from the multiplicity M of channelizers to the combiner k is comprised of a means of:

selecting a reference input constituent user complex baseband signals $m_0$;

estimating a multiplicity $M_u$ of differences in a phase of the reference input constituent user complex baseband signal $m_0$ and a phase of the multiplicity $M_u$ of constituent user complex baseband signal;

estimating a signal-to-residual interference plus noise power ratio of the multiplicity $M_u$ constituent user complex baseband signals;

assigning the weight to constituent user complex baseband signal m for m equal to 1 through $M_u$ equal to a product of a factor based on the corresponding signal-to-residual interference plus noise power ratios m and a complex exponential function of the corresponding difference in phase m of the multiplicity $M_u$ of differences in phase, wherein the multiplicity $M_u$ of weights is dependent upon the combiner k; and combining the weighted multiplicity $M_u$ constituent user complex baseband signals.

16. A receiver system for determining the direction of a plurality $N_J$ of jammers comprised of jammers in a coverage area with a plurality K of user signal sources distributed in the coverage area by introducing antenna beam nulls in the directions of the jammers and mitigating any antenna beam spurious nulls in the area of coverage, wherein $N_J$ is an integer greater than or equal to 1, the system comprised of:

an array of multiplicity N antenna feeds receiving radio frequency (RF) signals from the signal sources and the jammers in the area of coverage;

an RF to baseband conversion subsystem inputted with the RF signals from the array of antenna feeds for RF to baseband conversion of the RF signals for providing a multiplicity N of complex baseband signals;

a multiplicity M of digital beamformers, wherein M is an integer greater than 1, inputted with the multiplicity N of complex baseband signals with a digital beamformer m for m equal to 1 through M comprised of a corresponding distinct adaptive algorithm selected from a group comprised of a multiplicity $N_a$ of adaptive algorithms with $N_a$ greater than or equal to M providing a corresponding beamformer weight vector m of a multiplicity M of beamformer weight vectors at the beamformer output, for providing a multiplicity M of distinct antenna beam patterns covering the area of coverage wherein antenna beam pattern m for m equal to 1 through M receives signals from the multiplicity K of signal sources in the area of coverage and has nulls in the directions of the multiplicity $N_J$ of jammers comprised of jammers in the area of coverage;

a multiplicity M of evaluators of antenna beam gain patterns in the area of coverage, implemented by a computing device, inputted with the respective ones of the multiplicity M of digital beamformer weight vectors for generation of the corresponding ones of a multiplicity M of antenna beam gain patterns as functions of a pair of coordinates of the area of coverage;

a maximum gain selector for selecting the maximum of the M antenna beam patterns at a set of grid points spanning the area of coverage providing a maximum antenna gain pattern for mitigating any spurious nulls formed in the multiplicity M of antenna beam gain patterns; and a subsystem for finding the local minima in the maximum gain pattern for determining the directions of the multiplicity $N_J$ of jammers.

17. A method for receiving users signals from a plurality K of signal sources distributed in a area of coverage transmitting signals in a multiple access mode in the presence of a plurality $N_J$ of jammers comprised of jammers in the area of coverage wherein $N_J$ is an integer greater than or equal to 1, the method comprised of:

receiving radio frequency (RF) signals from the plurality K of user sources by an array of multiplicity N antenna feeds;

RF to baseband down conversion of the RF signals received from the array of antenna feeds for providing N a multiplicity N of complex baseband signals;

implementing, by a computing device, a multiplicity M of digital beamformers, wherein M is an integer greater than 1, inputted with the multiplicity N of complex baseband signals generating a multiplicity M of distinct antenna beams covering the area of coverage with the digital beamformer m for m equal to 1 through M comprised of a corresponding distinct adaptive algorithm selected from a group comprised of a multiplicity $N_a$ of adaptive algorithms with $N_a$ greater than or equal to M providing a corresponding beamformer weight vector m of a multiplicity M of beamformer weight vectors at the beamformer output, for providing a respective ones of a multiplicity M beamformer outputs wherein the antenna beam m for m equal to 1 through M of the multiplicity M antenna beams is for receiving the user signals from the plurality K of signal sources distributed in the area of coverage and introducing nulls in directions of the plurality $N_J$ of jammers comprised of jammers interference sources in the area of coverage;

implementing, by the computing device, a channelizer subsystem comprised of a multiplicity M of channelizers wherein a channelizer m for m equal to 1 through M is inputted with the output of the respective digital beamformer m of the multiplicity M of digital beamformers for providing a multiplicity K of constituent user complex baseband signals comprised of a constituent user k complex baseband signal for k equal to 1 through K at the output of channelizer m by a separation operation performed on the output of the digital beamformer m of the multiplicity M of digital beamformers; and implementing, by the computing device, a multiplicity K of weighted combiners wherein a weighted combiner k for k equal to 1 through K of the multiplicity K weighted combiners combines the weighted respective multiplicity M constituent user k complex baseband signals outputted from the multiplicity M channelizers for providing a corresponding reduced interference baseband signals k for k equal to 1 through K of the multiplicity K of reduced interference user baseband signals.

18. The method of claim 17, wherein the method is for further determining the directions of a plurality $N_J$ of jammers comprised of jammers in the area of coverage and mitigating any spurious nulls in the area of coverage, the method comprised of:

evaluating, by the computing device, a multiplicity M of antenna beam gain patterns in the area of coverage from the respective ones of the multiplicity M of digital beamformer comprised of corresponding multiplicity M of distinct adaptive algorithms outputting a multiplicity M of weight vectors for generation of the corresponding ones of a multiplicity M of antenna beam gain patterns as functions of a pair of coordinates of the area of coverage wherein the multiplicity M of antenna beams are for receiving the user signals from the plurality K of signal sources distributed in the area of coverage and introducing nulls in directions of the plurality $N_J$ of jammers comprised of jammers in the area of coverage;

evaluating, by the computing device, a maximum gain pattern by selecting the maximum of the multiplicity M antenna beam patterns at a set of grid points spanning the area of coverage providing a maximum antenna gain pattern for mitigating any spurious nulls formed in the multiplicity M of antenna beam gain patterns; and implementing, by the computing device, a subsystem for finding the multiplicity $N_J$ of local minima in the maximum gain pattern for determining the directions of the jammers.

19. The method of claim 7, wherein at least one of the multiplicity M of distinct adaptive algorithms for adaptation of the corresponding ones of the multiplicity M of digital beamformers for providing M different antenna beam patterns, is selected from a group of algorithms comprised of transformed state quantized state algorithms including transformed state quantized state 1 (TQS1), transformed state quantized state 2 (TQS2), transformed state quantized state 1 with constraints (TQC1), transformed state quantized state 2 with constraints (TQC2) algorithm, and a multiplicity of transformed state quantized state algorithms with multiple thresholds wherein a transformed state quantized state algorithm with multiple thresholds is comprised of a set consisting of a number of thresholds $N_t$, a threshold function with a multiplicity $N_t$ of threshold levels based on the power levels of and operating on components of a transformed state vector equal to a state vector multiplied by an eigenvector matrix of covariance matrix of the state vector, and a multiplicity $N_t$ plus 1 of output levels of the threshold function with components of the state vector comprised of the multiplicity N of complex baseband signals at the output of the RF to baseband conversion subsystem.

20. The method of claim 19, wherein the number of thresholds $N_t$, a multiplicity $N_t$ of threshold levels, and a multiplicity $N_t$ plus one of output levels of the threshold function are selected according to the following algorithm:
  1. Arrange multiplicity N power levels of the components of the transformed state vector in an increasing order of magnitude;
  2. Partition the multiplicity N power levels into a multiplicity $N_t$ groups wherein the power levels in a dB scale are within a Δ dB of each other with Δ greater than or equal to 0;
  3. The $j^{th}$ threshold level $V_{tj}$ for j equal to 1 through $N_t$ is selected equal to the square root of the maximum power level $P_j$ in group j multiplied by a constant α greater than 0;
  4. The output level corresponding to threshold $V_{t1}$ is selected equal to 1 wherein the output level $V_j$ corresponding to $V_{tj}$ for j equal to 2 through $N_t$ selected equal to the square root of the ratio of $P_j$ and $P_1$ multiplied by a constant β greater than 0 with the output level selected equal to 0 if the minimum threshold level $V_{t1}$ is not exceeded by the input of the threshold function.

21. The method of claim 17, wherein at least one of the multiplicity M of distinct adaptive algorithms for adaptation of the corresponding ones of the multiplicity M of digital beamformers is selected from a group of algorithms comprised of the sample matrix inversion (SMI), recursive least squares (RLS), correlation feedback (CF), quantized state algorithms including quantized state 1 (QS1), quantized state 2 (QS2), quantized state 1 with constraints (QC1), quantized state 2 with constraints (QC2) algorithms, and a multiplicity of generalized quantized state algorithms with multiple thresholds wherein a generalized quantized state algorithm is comprised of a set consisting of a number of thresholds $N_t$, a threshold function with a multiplicity $N_t$ of threshold levels based on the power levels of and operating on components of a state vector, and a multiplicity $N_t$ plus 1 of output levels of the threshold function, corresponding to the respective ones of the multiplicity of generalized quantized state algorithms with the components of the state vector comprised of the multiplicity N of complex baseband signals at the output of the RF to baseband conversion subsystem.

22. The method of claim 17, wherein a weighted combiner k for k equal to 1 through K of the multiplicity K of weighted combiners selecting a multiplicity $M_u$ less than or equal to M from a respective multiplicity M of constituent user complex baseband signals inputted from the multiplicity M of channelizers to the combiner k is comprised of a means of:
  selecting a reference input constituent user complex baseband signal $m_0$;
  estimating a multiplicity $M_u$ of differences in a phase of the reference input constituent user complex baseband signal $m_o$ and a phase of the multiplicity $M_u$ constituent user complex baseband signals;
  estimating the signal-to-residual interference plus noise power ratio of the multiplicity $M_u$ constituent user complex baseband signals; and
  assigning the weight to constituent user k complex baseband signal m for m equal to 1 through $M_u$ equal to the product of a factor based on the corresponding signal-to-residual interference plus noise power ratios m and a complex exponential function of the corresponding difference in phase m of the multiplicity $M_u$ of differences in phase, wherein the multiplicity $M_u$ of weights is dependent upon the combiner k; and
  combining the weighted multiplicity $M_u$ constituent user k complex baseband signals.

\* \* \* \* \*